(12) United States Patent
Takahama et al.

(10) Patent No.: US 8,848,253 B2
(45) Date of Patent: Sep. 30, 2014

(54) THRESHOLD MATRIX GENERATION METHOD, IMAGE DATA GENERATION METHOD, IMAGE DATA GENERATION APPARATUS, IMAGE RECORDING APPARATUS, AND THRESHOLD MATRIX

(71) Applicant: Dainippon Screen Mfg. Co., Ltd., Kyoto (JP)

(72) Inventors: Ikuhiko Takahama, Kyoto (JP); Hiroshi Asai, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 0 days.

(21) Appl. No.: 13/852,414

(22) Filed: Mar. 28, 2013

(65) Prior Publication Data

US 2013/0257955 A1 Oct. 3, 2013

(30) Foreign Application Priority Data

Mar. 28, 2012 (JP) ................................. 2012-074257

(51) Int. Cl.
*H04N 1/405* (2006.01)
*G06K 15/00* (2006.01)
*B41J 2/21* (2006.01)
*H04N 1/52* (2006.01)

(52) U.S. Cl.
CPC ............. *B41J 2/2121* (2013.01); *H04N 1/4051* (2013.01); *H04N 1/52* (2013.01)
USPC ........................................ 358/3.13; 358/3.06

(58) Field of Classification Search
USPC .................. 358/3.03–3.09, 3.1, 3.3, 534–536
See application file for complete search history.

(56) References Cited

U.S. PATENT DOCUMENTS

| | | | | |
|---|---|---|---|---|
| 7,532,365 | B2 * | 5/2009 | Asai et al. ..................... | 358/3.13 |
| 8,279,490 | B2 | 10/2012 | Asai | |
| 2002/0101617 | A1 * | 8/2002 | Nagae et al. ................. | 358/3.17 |
| 2006/0159353 | A1 * | 7/2006 | Nagae et al. ................. | 382/237 |
| 2008/0291500 | A1 * | 11/2008 | Asai ............................. | 358/3.06 |
| 2009/0262398 | A1 * | 10/2009 | Asai et al. .................... | 358/3.06 |
| 2009/0262399 | A1 * | 10/2009 | Usui ............................ | 358/3.06 |

FOREIGN PATENT DOCUMENTS

JP 2008-294702 A 12/2008

* cited by examiner

*Primary Examiner* — Barbara Reinier
(74) *Attorney, Agent, or Firm* — McDermott Will & Emery LLP

(57) ABSTRACT

A threshold matrix generation part determines a turn-on order in a matrix area where a threshold matrix is generated and determines a threshold value of each matrix element. In determining the turn-on order, a temporary evaluation value element is obtained based on a distance between each undetermined matrix element whose position in the turn-on order has not been determined and each determined matrix element. If these matrix elements are located in the same position with respect to a row or column direction, the temporary evaluation value element is corrected such that the undetermined matrix element is less evaluated based on the evaluation value. Then, the position of an undetermined matrix element that is most highly evaluated in the turn-on order is determined. Accordingly, a threshold matrix that suppresses the occurrence of a grid-like dot pattern can be provided.

23 Claims, 12 Drawing Sheets

THRESHOLD MATRIX GENERATION METHOD, IMAGE DATA GENERATION METHOD, IMAGE DATA GENERATION APPARATUS, IMAGE RECORDING APPARATUS, AND THRESHOLD MATRIX

TECHNICAL FIELD

The present invention relates to a threshold matrix that is compared with a multi-tone original image when halftoning the original image, and a threshold matrix generation method of generating the threshold matrix, and relates to an image data generation method, an image data generation apparatus, and an image recording apparatus.

BACKGROUND ART

Conventionally, a multi-tone (i.e., continuous tone) original image has been halftoned using a threshold matrix and recorded on a recording medium. As one example of the threshold matrix generation methods, such a method as disclosed in Japanese Patent Application Laid-Open No. 2008-294702 is known, in which an evaluation value is obtained based on the distance between each target pixel and the previously turned-on pixel so that the pixel that is subsequently turned on is as distant as possible from the previously turned-on pixel, and a turn-on order is determined based on the evaluation values.

Incidentally, in the case of recording images using a threshold matrix generated by the method as disclosed in Japanese Patent Application Laid-Open No. 2008-294702, areas where dots are disposed in a grid may appear in a specific tonal range. Such grid-like dot areas will feel unnatural to viewers of images when compared with areas where dots are randomly disposed.

SUMMARY OF INVENTION

The present invention is intended for a threshold matrix generation method of generating a threshold matrix that is compared with a multi-tone original image when halftoning the original image, and it is an object of the present invention to provide a threshold matrix that suppresses the occurrence of a grid-like dot pattern.

The threshold matrix generation method includes the steps of a) obtaining an evaluation value element for a given undetermined matrix element in a matrix area based on a positional relationship between each determined matrix element and the undetermined matrix element while taking into consideration repetitive application of a threshold matrix when halftoning an original image, the undetermined matrix element being a matrix element whose position in a turn-on order has not been determined, the turn-on order indicating an order in which dots are added with increasing tone level, the matrix area being an area where the threshold matrix is generated and in which a plurality of matrix elements are arranged in a row direction and a column direction, the determined matrix element being a matrix element whose position in the turn-on order has been determined, b) adding up an evaluation value element regarding the each determined matrix element so as to obtain an evaluation value for the undetermined matrix element, c) performing the steps a) and b) for all undetermined matrix elements, d) determining, in the turn-on order, a position of an undetermined matrix element that is most highly evaluated based on the evaluation value among the all undetermined matrix elements, e) repeating the steps a) through d) until positions of the all undetermined matrix elements in the turn-on order are determined, and f) determining a threshold value of each matrix element in the matrix area in accordance with the turn-on order. At least in a case where a ratio of the number of determined matrix elements to the number of the plurality of matrix elements is within a predetermined range, the step a) includes the steps of a1) obtaining the evaluation value element based on a distance in the row direction between the undetermined matrix element and the each determined matrix element and a distance in the column direction between the undetermined matrix element and the each determined matrix element, and a2) if the positional relationship between the each determined matrix element and the undetermined matrix element is a predetermined specific positional relationship, correcting the evaluation value element regarding the each determined matrix element such that the undetermined matrix element is less evaluated based on the evaluation value, and if the positional relationship is not the specific positional relationship, correcting the evaluation value element regarding the each determined matrix element such that the undetermined matrix element is more highly evaluated based on the evaluation value, the specific positional relationship being a relationship in which the each determined matrix element is located in the same position as the undetermined matrix element with respect to the row direction or the column direction. With this method, it is possible to provide a threshold matrix that suppresses the occurrence of a grid-like dot pattern.

According to a preferred embodiment of the present invention, the specific positional relationship further includes a condition that a distance between the each determined matrix element and the undetermined matrix element is less than or equal to a predetermined distance.

According to another preferred embodiment of the present invention, the specific positional relationship further includes a condition that a distance between the each determined matrix element and the undetermined matrix element is two times a pitch of the matrix elements.

According to another preferred embodiment of the present invention, the step a) further includes the step of a3) if the positional relationship between the each determined matrix element and the undetermined matrix element is another predetermined specific positional relationship, correcting the evaluation value element regarding the each determined matrix element such that the undetermined matrix element is more highly evaluated based on the evaluation value, and if the positional relationship is not the other specific positional relationship, correcting the evaluation value element regarding the each determined matrix element such that the undetermined matrix element is less evaluated based on the evaluation value, the other specific positional relationship being a relationship in which an angle formed by the row direction and a direction in which a linear area that includes the each determined matrix element and the undetermined matrix element extends is 45 degrees.

More preferably, the other specific positional relationship further includes a condition that the distance in the row direction between the each determined matrix element and the undetermined matrix element and the distance in the column direction between the each determined matrix element and the undetermined matrix element are each less than or equal to a predetermined distance. Alternatively, the other specific positional relationship further includes a condition that the distance in the row direction between the each determined matrix element and the undetermined matrix element and the distance in the column direction between the each determined matrix element and the undetermined matrix element are each equal to a pitch of the matrix elements.

According to another aspect of the present invention, the threshold matrix generation method includes the steps of a) obtaining an evaluation value element for a given undetermined matrix element in a matrix area based on a positional relationship between each determined matrix element and the undetermined matrix element while taking into consideration repetitive application of a threshold matrix when halftoning an original image, the undetermined matrix element being a matrix element whose position in a turn-on order has not been determined, the turn-on order indicating an order in which dots are added with increasing tone level, the matrix area being an area where the threshold matrix is generated and in which a plurality of matrix elements are arranged in a row direction and a column direction, the determined matrix element being a matrix element whose position in the turn-on order has been determined, b) adding up an evaluation value element regarding the each determined matrix element so as to obtain an evaluation value for the undetermined matrix element, c) performing the steps a) and b) for all undetermined matrix elements, d) determining, in the turn-on order, a position of an undetermined matrix element that is most highly evaluated based on the evaluation value among the all undetermined matrix elements, e) repeating the steps a) through d) until positions of the all undetermined matrix elements in the turn-on order are determined, and f) determining a threshold value of each matrix element in the matrix area in accordance with the turn-on order. At least in a case where a ratio of the number of determined matrix elements to the number of the plurality of matrix elements is within a predetermined range, the step a) includes the steps of a1) obtaining the evaluation value element based on a distance in the row direction between the undetermined matrix element and the each determined matrix element and a distance in the column direction between the undetermined matrix element and the each determined matrix element, and a2) if the positional relationship between the each determined matrix element and the undetermined matrix element is a predetermined specific positional relationship, correcting the evaluation value element regarding the each determined matrix element such that the undetermined matrix element is more highly evaluated based on the evaluation value, and if the positional relationship is not the specific positional relationship, correcting the evaluation value element regarding the each determined matrix element such that the undetermined matrix element is less evaluated based on the evaluation value, the specific positional relationship being a relationship in which an angle formed by the row direction and a direction in which a linear area that includes the each determined matrix element and the undetermined matrix element extends is 45 degrees. With this method, it is possible to provide a threshold matrix that suppresses the occurrence of a grid-like dot pattern.

According to a preferred embodiment of the present invention, the specific positional relationship further includes a condition that the distance in the row direction between the each determined matrix element and the undetermined matrix element and the distance in the column direction between the each determined matrix element and the undetermined matrix element are each less than or equal to a predetermined distance.

According to another preferred embodiment of the present invention, the specific positional relationship further includes a condition that the distance in the row direction between the each determined matrix element and the undetermined matrix element and the distance in the column direction between the each determined matrix element and the undetermined matrix element are each equal to a pitch of the matrix elements.

The present invention is also intended for an image data generation method of generating image data. The image data generation method includes the steps of generating a threshold matrix, and generating halftone image data in which a multi-tone original image is halftoned by comparing the original image with the threshold matrix, The present invention is also intended for an image data generation apparatus for generating image data. The image data generation apparatus includes a matrix storage part that stores a threshold matrix, and an image data generation part that generates halftone image data in which a multi-tone original image is halftoned by comparing the original image with the threshold matrix, The present invention is also intended for an image recording apparatus. The image recording apparatus includes a dot output element that records a dot at a dot recording position on a recording medium, a movement mechanism that moves the dot recording position on the recording medium relative to the recording medium, a matrix storage part that stores a threshold matrix, an image data generation part that generates halftone image data in which a multi-tone original image is halftoned by comparing the original image with the threshold matrix, and an output control part that controls output of the dot output element based on the halftone image data in parallel with movement of the dot recording position on the recording medium relative to the recording medium.

The present invention is also intended for a threshold matrix that is compared with a multi-tone original image when halftoning the original image. The threshold matrix is generated by the above-described threshold matrix generation method.

These and other objects, features, aspects and advantages of the present invention will become more apparent from the following detailed description of the present invention when taken in conjunction with the accompanying drawings.

DESCRIPTION OF EMBODIMENTS

Figure 1:
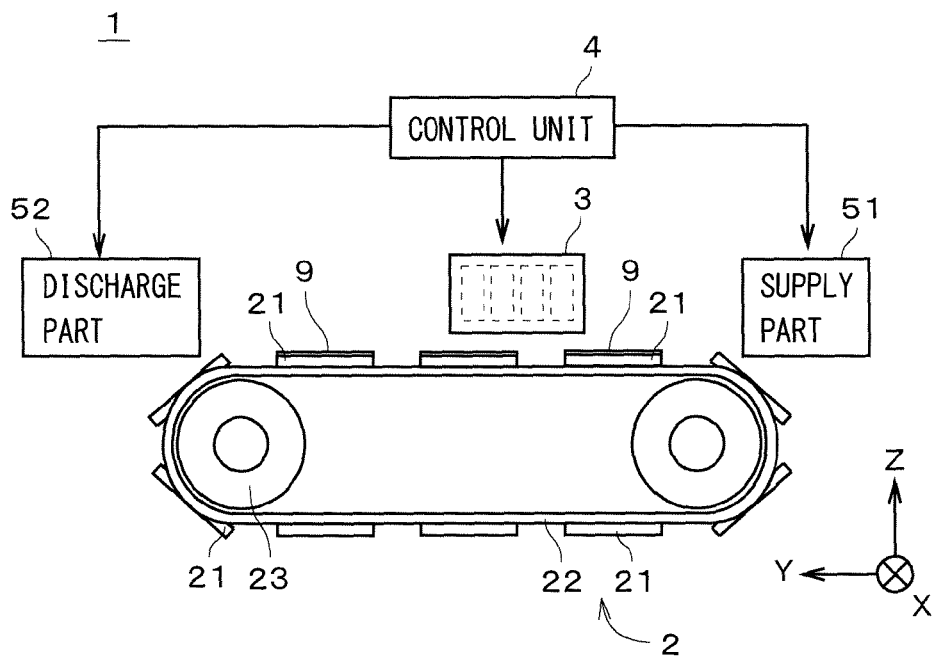
FIG. 1 is a diagram showing a configuration of an image recording apparatus according to an embodiment.

FIG. 1 illustrates a configuration of an image recording apparatus 1 according to an embodiment of the present invention. The image recording apparatus 1 is a sheet-fed printing apparatus (so-called "inkjet printer") that sequentially records color images on a plurality of recording media 9 that serve as printing paper by ejecting fine droplets of ink on the recording media 9.

As illustrated in FIG. 1, the image recording apparatus 1 includes a movement mechanism 2 for moving the recording media 9 in a movement direction that is the (+Y) direction in FIG. 1, an ejection unit 3 that ejects fine droplets of ink toward the recording media 9 that are being conveyed by the movement mechanism 2, a supply part 51 that supplies the recording media 9 to the movement mechanism 2, a discharge part 52 that receives the printed recording media 9 from the movement mechanism 2, and a control unit 4 that controls these mechanisms. The ejection unit 3 is disposed above the movement mechanism 2 (on the (+Z) side) and fixed to a frame (not shown).

The movement mechanism 2 includes a plurality of stages 21, an annular guide 22, and a belt driving mechanism 23. The stages 21 each adsorb and hold a sheet of recording medium 9. The guide 22 includes a belt to which the stages 21 are connected, and guides the stages 21. The belt driving mechanism 23 moves the stages 21 on which the recording media 9 are held in the (+Y) direction below the ejection unit 3 (i.e., on the (−Z) side) by moving the belt in the guide 22 counterclockwise in FIG. 1.

Figure 2:
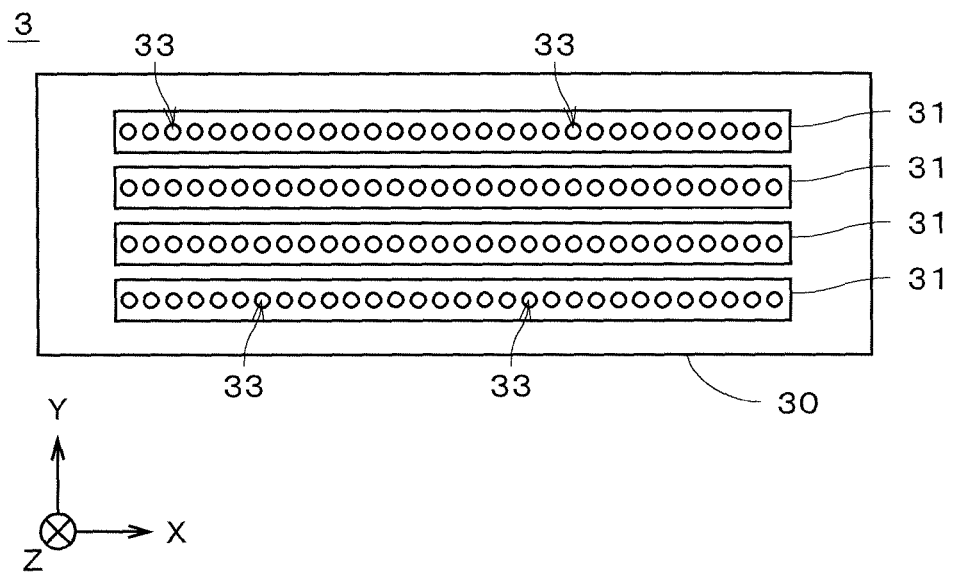
FIG. 2 is a bottom view of an ejection unit.

FIG. 2 is a bottom view of the ejection unit 3. The ejection unit 3 is provided with heads 31 that serve as a plurality of (in the present embodiment, four) ejection parts, each ejecting a different color ink to the recording media 9. The heads 31 have the same structure. The heads 31 are arranged in the Y direction (i.e., movement direction) and attached to an attachment part 30 of the ejection unit 3. Each head 31 has a plurality of outlets 33 arranged in the X direction perpendicular to the Y direction that is the movement direction of the recording media 9. The number of outlets 33 illustrated in FIG. 2 is smaller than the actual number of outlets. Note that the outlets 33 do not necessarily have to be arranged in the X direction, and it is sufficient for the outlets 33 to be arranged in a direction that intersects with the Y direction.

The head 31 on the most downstream side in the Y direction (−Y side) in FIG. 2 ejects K (black) ink, the head 31 on the (+Y) side of the K ink head 31 ejects C (cyan) ink, the head 31 on the (+Y) side of the C ink head 31 ejects M (magenta) ink, and the head 31 on the most upstream side in the Y direction (+Y side) ejects Y (yellow) ink. Note that the ejection unit 3 may also be provided with inkjet heads for other colors such as light cyan, light magenta, or white.

In the image recording apparatus 1, with respect to the X direction, each head 31 is provided over the entire recording area of a recording medium 9 (in the present embodiment, across the entire width of a recording medium 9 in the X direction). An output control part 41 (see FIG. 3) of the control unit 4 controls the ejection unit 3 and the movement mechanism 2 so that the recording of an image on a recording medium 9 is completed by the recording medium 9 passing only once over positions facing the heads 31 of the ejection unit 3.

In other words, the image recording apparatus 1 performs single-pass printing on a recording medium 9 in such a way that the outlets 33 that serve as a plurality of dot output elements of the respective heads 31 eject fine droplets of ink so as to record dots at a plurality of dot recording positions that are arranged on the recording medium 9 across the entire width in a width direction perpendicular to the aforementioned movement direction, and the dot recording positions on the recording medium 9 are moved only once in the movement direction relative to the recording medium 9.

Figure 3:
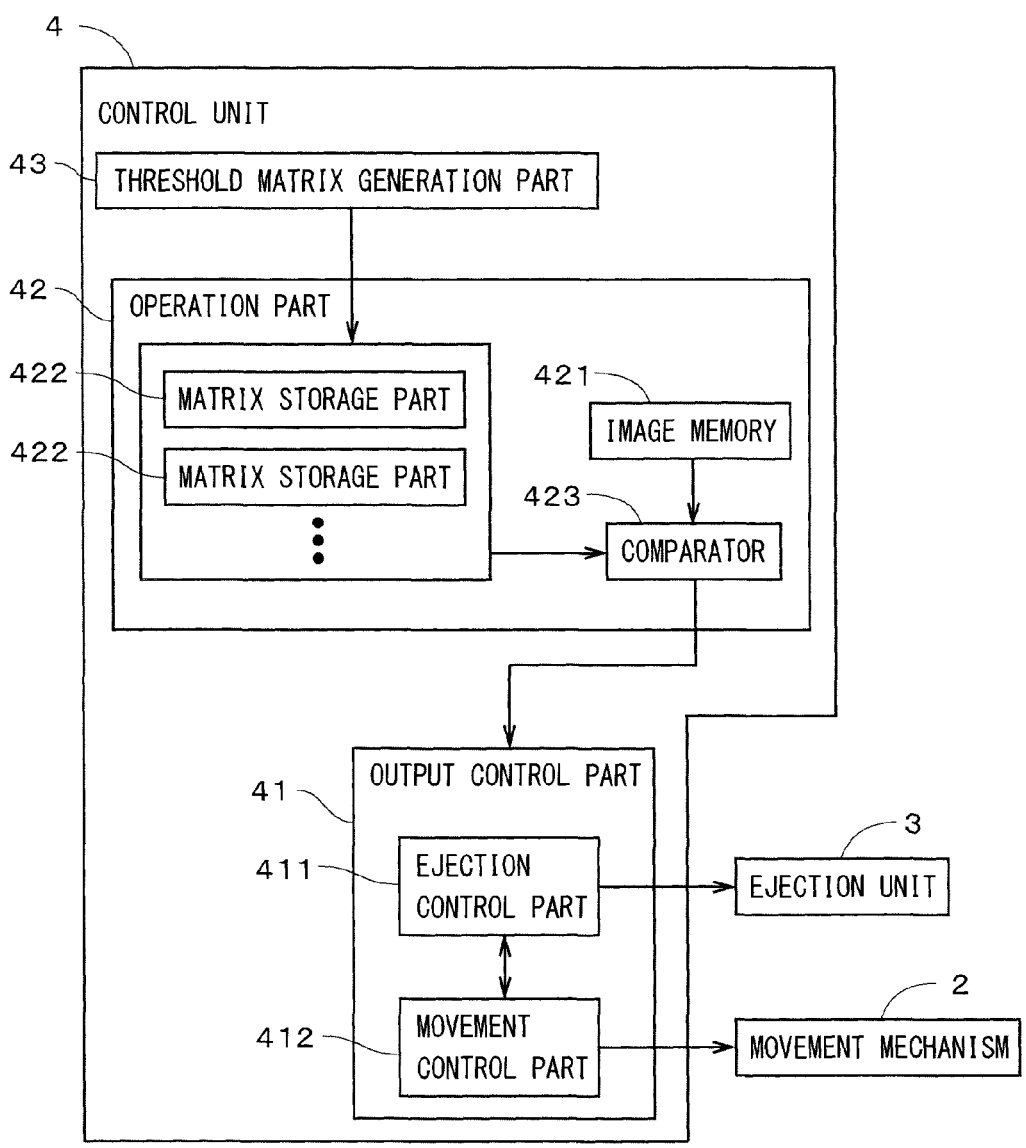
FIG. 3 is a block diagram showing functions of a control unit.

The control unit 4 is configured as a general computer system in which a CPU that performs various types of computational processing, a ROM that stores a basic program, and a RAM that stores various types of information are connected to a bus line. FIG. 3 is a block diagram showing functions of the control unit 4. In FIG. 3, part of the configuration of the image recording apparatus 1 that is connected to the control unit 4 is illustrated together. The control unit 4 includes the aforementioned output control part 41, an operation part 42 that performs various types of calculations, and a threshold matrix generation part 43. The threshold matrix generation part 43 generates a threshold matrix that is used when halftoning a multi-tone original image. The method for generating a threshold matrix will be described later.

The operation part 42 includes an image memory 421, a plurality of matrix storage parts 422 (also called "screen pattern memories (SPMs)"), and a comparator 423 (halftoning circuit). The image memory 421 stores data of a color original image (hereinafter, referred to as "original image data") that is input from outside. The matrix storage parts 422 are memories in which threshold matrices generated for a plurality of color components by the threshold matrix generation part 43 are stored. The comparator 423 is a comparison part that compares the original image data with the threshold matrix for each color component. Note that the comparison part may be realized by software.

The output control part 41 includes an ejection control part 411 and a movement control part 412. The movement control part 412 controls movement of the recording media 9 relative to the ejection unit 3 by the movement mechanism 2 based on the output from the operation part 42. The ejection control part 411 controls ink ejection from the outlets 33 of the ejection unit 3 in synchronization with the movement of the recording media 9 relative to the ejection unit 3 based on the output from the operation part 42.

Figure 4:
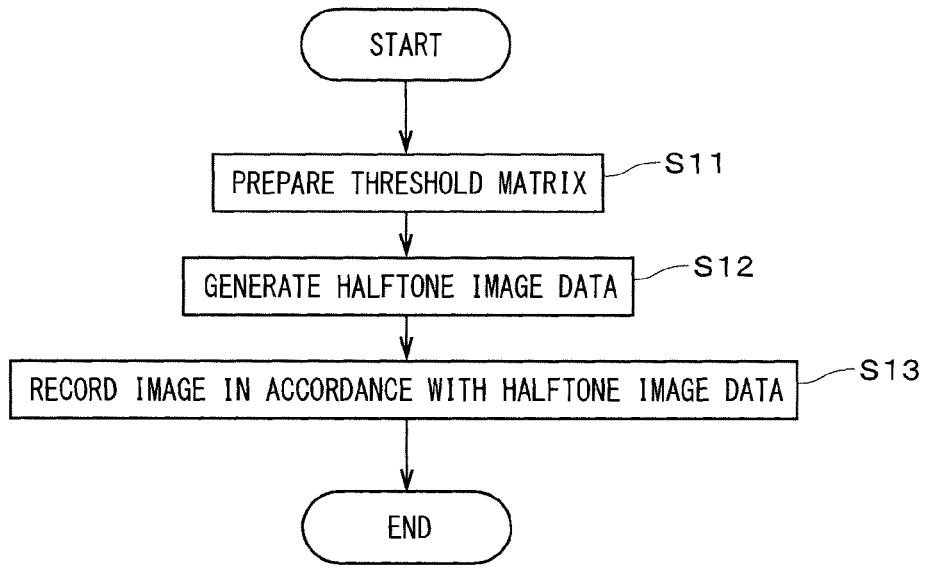
FIG. 4 is a flowchart of processing for generating halftone image data.

Next, operations for recording an image performed by the image recording apparatus 1 will be described with reference to FIG. 4. In the image recording apparatus 1, threshold matrices generated by a generation method, which will be described later (see FIGS. 6.A and 6.B) are stored in the matrix storage parts 422 as preparation (step S11). Also, color original image data is input to the image memory 421 of the operation part 42 from an external computer and stored therein.

Figure 5:
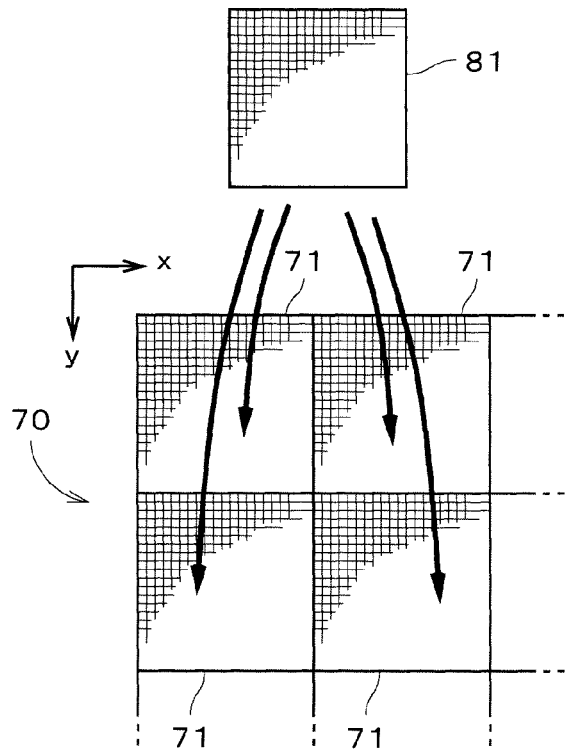
FIG. 5 illustrates an original image and a threshold matrix.

FIG. 5 is a conceptual illustration of an original image 70 and a threshold matrix 81. The original image 70 and the threshold matrix 81 each have a plurality of pixels or elements arranged in a column direction that corresponds to the movement direction (indicated as the y direction in FIG. 5) and a row direction perpendicular to the column direction (indicated as the X direction in FIG. 5). In the following description, it is assumed that the original image 70 is expressed in the tonal range of 0 to 255.

When the original image data indicating the original image 70 has been stored in the image memory 421 (see FIG. 3), halftone color image data for expressing a multi-tone image indicated by the original image data (in actuality, image expressed by FM screening when recorded on a recording medium 9) is generated by comparing the original image data with the threshold matrix 81 for each color component. In the following description, not only the processing for recording a halftone image for expressing an original image on a recording medium 9 based on the original image but also the processing for generating halftone image data from original image data is also referred to as "halftoning".

When halftoning an original image, repetitive areas 71 that are the units of halftoning are set by dividing the entire area indicated by the original image 70 into a large number of areas of the same size as shown in FIG. 5. Each matrix storage part 422 (see FIG. 3) has a storage area corresponding to a single repetitive area 71 and stores a threshold matrix 81 in which a threshold value is set at each address (coordinates) in this storage area. Conceptually, each repetitive area 71 of the original image 70 and the threshold matrix 81 for each color component are superimposed on each other, and a tone value (pixel value) of the color component of each pixel in the repetitive area 71 is compared with the corresponding threshold value in the threshold matrix 81, whereby it is determined whether or not to perform recording (form a dot of that color) at the position of that pixel on a recording medium 9.

In actuality, the tone value of a single pixel in the original image data is read for each color component from the image memory 421 based on an address signal given from an address generator of the comparator 423 in FIG. 3. The address generator also generates an address signal that indicates a position in a repetitive area 71 that corresponds to the pixel in the original image 70, and a single threshold value in the threshold matrix 81 for each color component is specified and read from the matrix storage part 422 for that color component. Then, the tone value from the image memory 421 and the threshold value from the matrix storage part 422 are compared for each color component by the comparator 43, and as a result, the tone value at that pixel position (address) in binary output image data for that color component is determined. Accordingly, when focusing on one color component of the multi-tone original image 70 shown in FIG. 5, for example, a tone value of "1" is given to (i.e., dot is formed at) positions with greater tone values than the corresponding threshold values in the threshold matrix 81, and a tone value of "0" is given to the remaining pixels (i.e., dot is not formed). As a result, binary output image data is generated as halftone image data for that color component (step S12). If the size of the dot recorded on a recording medium 9 can be changed, in step S12, grayscale output image data is generated as halftone image data.

As described above, the operation part 42 shown in FIG. 3 halftones input original image data into halftone image data by comparing a plurality of tone values in the original image data with a plurality of threshold values in the threshold matrix 81 at corresponding pixel positions (for the threshold matrix 81, element positions), using the comparator 423. In other words, the comparator 423 serves as an image data generation part that generates halftone image data, and the operation part 42 serves as an image data generation apparatus that halftones a multi-tone original image into halftone image data by storing the threshold matrices 81 generated by the threshold matrix generation part 43 and comparing the original image with the threshold matrices 81.

In the image recording apparatus 1 in FIG. 1, the movement control part 412 of the output control part 41 controls the speed, amount, and the like of the movement of the recording media 9 by the movement mechanism 2, whereby a plurality of dot recording positions on a recording medium 9 is moved relative to the recording medium 9. Then, the ejection control part 411 controls ink ejection (i.e., dot output) from the outlets 33 of the respective heads 31 based on the halftone image data in parallel with the movement of the dot recording positions relative to the recording medium 9.

Specifically, in the image recording apparatus 1, when halftone image data (piece) of a portion that is first printed in the original image 70 (e.g., a plurality of repetitive areas 71 on the most (−y) side in the y direction) has been generated for each color, the movement control part 412 drives the movement mechanism 2 to start moving the recording media 9. Then, in parallel with the above halftoning processing (processing for generating halftone image data), the ejection control part 411 controls ink ejection from the outlets 33 of the respective heads 31 in synchronization with the movement of the recording media 9 relative to the ejection unit 3 in the movement direction.

Here, since the halftone image data is data for recording an image on a recording medium 9, it can be perceived that a plurality of pixels in the halftone image data are arranged and set on the recording medium 9. The ejection control part 411 operates in synchronization with the movement of the recording medium 9 relative to the ejection unit 3 serving as a dot forming part in such a way that if the tone value in the halftone image data that corresponds to an ejection position (i.e., dot forming position) of each outlet 33 on the recording medium 9 is "1", a dot is formed on that ejection position, and if the tone value in the halftone image data is "0", a dot is not formed at that ejection position.

In this way, for each color of black, cyan, magenta, and yellow, while a plurality of ejection positions on the recording medium 9 that correspond respectively to the plurality of outlets 33 is being moved relative to the recording medium 9, ink ejection from the outlets 33 of the respective heads 31 is controlled (i.e., the amounts of ink ejected from the respective outlets 33 are determined) based on the halftone image data obtained as a result of comparison between the tone values in the original image 70 at the ejection positions and the corresponding threshold values in the threshold matrix 81 for halftoning original image.

In the image recording apparatus 1, for each color of black, cyan, magenta, and yellow, the operation of recording an image in accordance with halftone image data is performed in parallel with the generation of the halftone image data, and as a result, a halftone color image that expresses a color original image is recorded on a recording medium 9 (step S13).

Figure 6A:
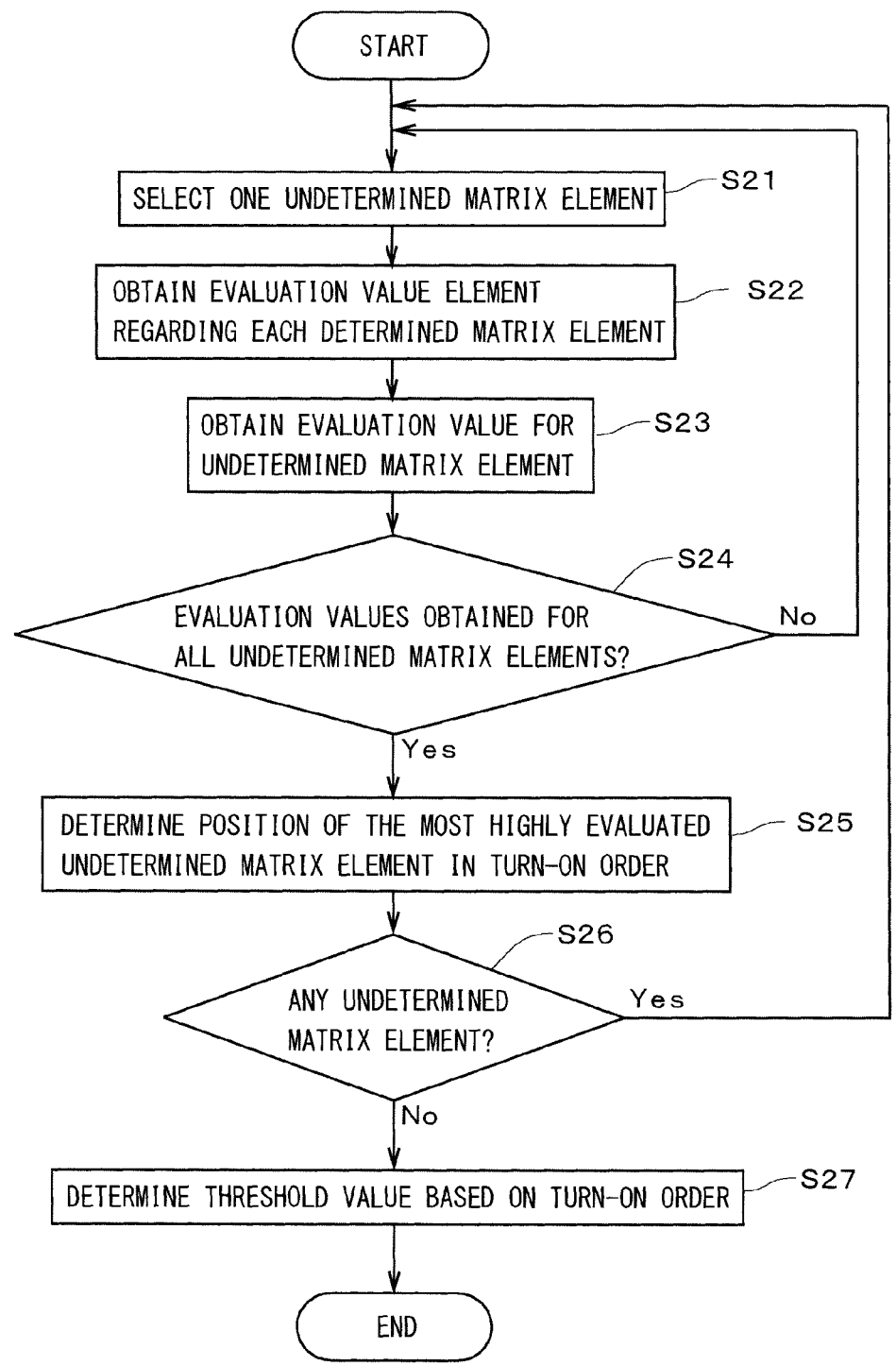
FIG. 6A is a flowchart of processing for generating a threshold matrix.

Next, the generation of a threshold matrix by the threshold matrix generation part 43, i.e., the determination of the threshold values of a plurality of matrix elements in a threshold matrix, will be described with reference to FIGS. 6A and 6B. The threshold matrix generation part 43 of the control unit 4 first sets a matrix area 80 in which a plurality of matrix elements 811 are arranged in a row direction that corresponds to the width direction and a column direction that corresponds to the movement direction as shown in FIG. 7, as an area where a threshold matrix for a single color is generated. The matrix elements 811 are arranged at the same pitch (hereinafter, referred to as an "element pitch") in the row and column directions. In FIG. 7, the matrix area 80 is illustrated in a simplified form, with a smaller number of matrix elements 811 than the actual number of matrix elements 811. Each matrix element 811 is indicated by a thin line in FIG. 7 (the same applies to FIGS. 8 to 10).

The threshold matrix generation part 43 determines a turn-on order of all the matrix elements 811 in the matrix area 80, the turn-on order indicating an order of the matrix elements 811 in which dots are added with increasing tone level, and then determines the threshold value of each matrix element 811 in the matrix area 80 based on the turn-on order.

Specifically, first, one of the matrix elements 811 included in the threshold matrix 81 is determined to be the first ("1") in the turn-on order. In other words, a dot is always formed at a pixel that corresponds to that one matrix element 811 when dots are formed in an image area corresponding to the threshold matrix 81. In the present embodiment, a matrix element 811 that is located in the upper left corner of the threshold matrix 81 in FIG. 7 and indicated by diagonal parallel lines is determined to be "1" in the turn-on order. Note that the position of the matrix element 811 that is determined to be "1" in the turn-on order may be arbitrarily determined, and the matrix element 811 that is determined to be "1" in the turn-on order may be another matrix element 811 other than the matrix element 811 in the upper left corner. In FIG. 7, matrix elements 811 whose positions in the turn-on order have been determined are indicated by encircled numbers that indicate positions in the turn-on order (the same applies to FIGS. 9 and 10).

Next, one of undetermined matrix elements 811 whose positions in the turn-on order have not been determined is selected in the matrix area 80 (step S21). Then, an evaluation value element is obtained based on the positional relationship between the selected undetermined matrix element and the determined matrix element 811 whose position in the turn-on order has been determined. If there is more than one determined matrix element, an evaluation value element is obtained for each determined matrix element.

Figure 8:
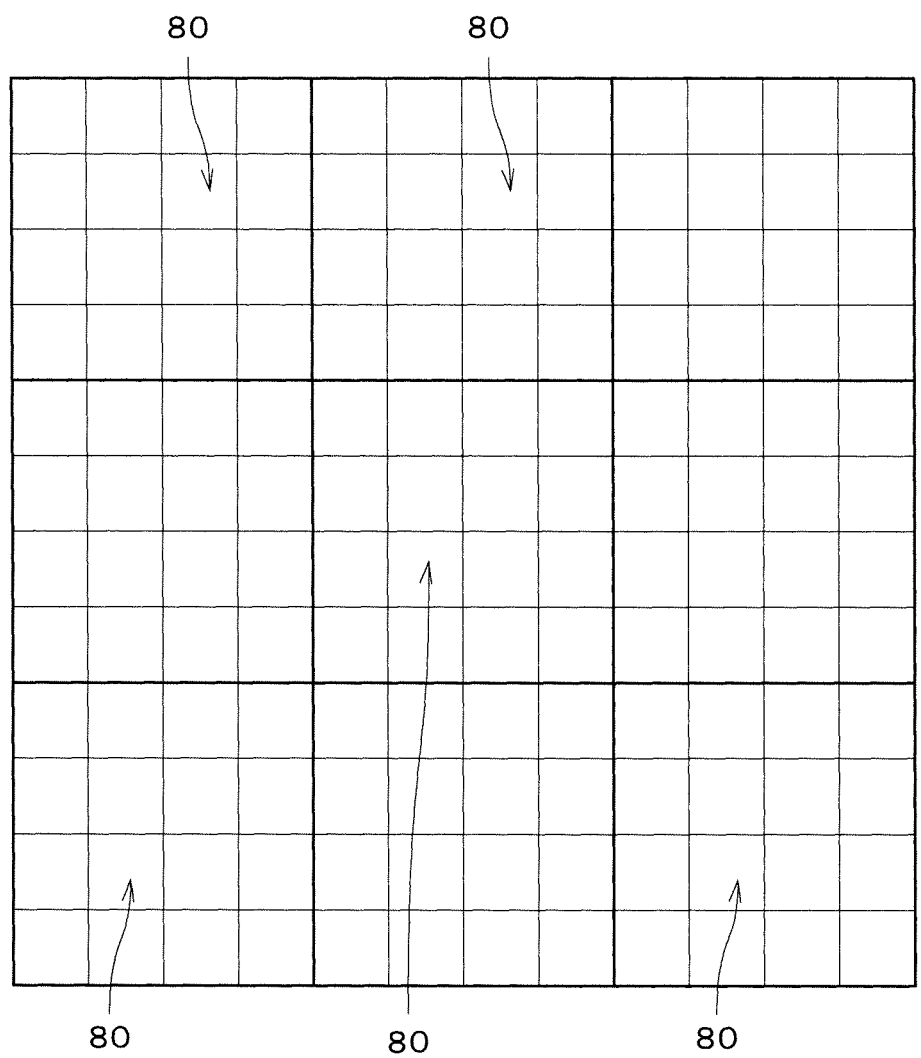
FIG. 8 illustrates a plurality of matrix areas.

In actuality, because the original image 70 is constituted by repetitions of the top, bottom, left, and right repetitive areas 71, repetitive application of the threshold matrix 81 for halftoning of the original image 70 is taken into consideration when calculating an evaluation value element. Thus, after having arranged nine matrix areas 80 in a square shape as shown in FIG. 8, evaluation value elements regarding determined matrix elements that are respectively located within the nine matrix areas 80 are obtained based on the positional relationship between the aforementioned undetermined matrix element in the center matrix area 80 and each of the determined matrix elements that are located at the same position in their corresponding matrix areas 80 (step S22). A specific way of obtaining an evaluation value element will be described later.

Then, the evaluation value elements regarding the respective determined matrix elements are totaled, yielding an evaluation value for the undetermined matrix element (step S23). The evaluation value indicates a deviation in the distribution of colored areas in the case where it is assumed that all the determined matrix elements and the selected undetermined matrix element have been colored. If the deviation in the distribution of colored areas is small, the undetermined matrix element is highly evaluated based on the evaluation value. In the present embodiment, undetermined matrix elements with smaller evaluation values are more highly evaluated.

If an undetermined matrix element for which the evaluation value has not been obtained is present (step S24), the processing returns to step S21, and the selection of one undetermined matrix element, the calculation of evaluation value elements regarding the determined matrix elements, and the calculation of an evaluation value that is the total of the evaluation value elements (from steps S21 to S23) are performed. In the image recording apparatus 1, the evaluation values for all undetermined matrix elements are obtained through the execution of steps S21 to S23 (step S24).

Then, with reference to the evaluation values obtained for all the undetermined matrix elements, one undetermined matrix element that is most highly evaluated based on the evaluation value is determined to be the second ("2") in the turn-on order (step S25). Referring to the nine matrix areas 80 shown in FIG. 8, an undetermined matrix element that is located furthest from the respective determined matrix elements that are "1" in the turn-on order is most highly evaluated based on the evaluation value. Thus, in the matrix area 80 shown in FIG. 7, a matrix element 811 that is located in the third column from the left and the third row from the top and indicated by diagonal parallel lines is determined to be "2" in the turn-on order.

Then, if an undetermined matrix element is present (step S26), the processing returns to step S21 and performs the aforementioned steps S21 to S25, whereby one undetermined matrix element is determined to be the third "3" in the turn-on order.

Hereinafter, a specific way of obtaining the matrix element 811 that is the third "3" in the turn-on order will be described with reference to FIG. 6B. FIG. 6B is a flowchart of processing for calculating an evaluation value element regarding one determined matrix element. In the following description, a matrix number is assigned to each of the nine matrix areas 80 shown in FIG. 8 and in FIGS. 9 and 10, which will be described later, in order to distinguish among these matrix areas 80. The center matrix area 80 has a matrix number of "0", the three matrix areas 80 in the upper row have matrix numbers of "1", "2", and "3", respectively, in order from the left. The left and right matrix areas 80 in the middle row have matrix numbers of "4" and "5", respectively, and the matrix areas 80 in the lower row have matrix numbers of "6", "7", and "8", respectively, in order from the left.

In step S21, when an undetermined matrix element (hereinafter, indicated by 811a) that is located in the third column from the left and the first row from the top in the matrix area 80 whose matrix number is "0" has been selected, the undetermined matrix element being indicated by diagonal parallel lines that are different from those indicating the determined matrix elements (hereinafter, indicated by 811b) in FIG. 9, first, an evaluation value element regarding the determined matrix elements 811b that are "1" in the turn-on order is obtained. Specifically, if dxi is the distance in the column direction between the selected undetermined matrix element 811a and each of the nine determined matrix elements 811b that are "1" in the turn-on order and dyi is the distance in the row direction therebetween, a temporary evaluation value element Etmp is obtained using Eq. 1 based on the distance dxi and the distance dyi (step S221). The numerical subscript i is an integer from 0 to 8 and indicates the matrix numbers of the aforementioned nine matrix areas 80.

$$Etmp = \sum_{i=0}^{8} \frac{1}{dxi^2 + dyi^2} \quad \text{(Eq. 1)}$$

If the element pitch between the matrix elements 811 is set to 1, Eq. 1 can be expressed as Eq. 2 below, according to which the temporary evaluation value element Etmp regarding the determined matrix elements 811b that are "1" in the turn-on order is approximately 0.77.

$$Etmp = \frac{1}{2^2 + 0^2} + \frac{1}{6^2 + 4^2} + \frac{1}{2^2 + 4^2} + \frac{1}{2^2 + 4^2} + \quad \text{(Eq. 2)}$$
$$\frac{1}{6^2 + 0^2} + \frac{1}{2^2 + 0^2} + \frac{1}{6^2 + 4^2} + \frac{1}{2^2 + 4^2} + \frac{1}{2^2 + 4^2}$$

In the image recording apparatus 1, if the positional relationship between any of the determined matrix elements 811b and the undetermined matrix element 811a is a predetermined specific positional relationship (hereinafter, referred to as a "specific positional relationship"), the temporary evaluation value element Etmp regarding the determined matrix elements 811b is corrected so that the undetermined matrix element 811a is less evaluated based on the evaluation value as described above (in the present embodiment, the evaluation value is increased) (steps S222 and S223).

In the image recording apparatus 1 according to the first embodiment, the above specific positional relationship is such a positional relationship that any of the determined matrix elements 811b is located in the same position as the undetermined matrix element 811a with respect to the row direction or the column direction, and either of the following conditions is satisfied, namely the condition that the distance dxi is equal to two times the element pitch and the distance dyi is zero and the condition that the distance dxi is 0 and the distance dyi is equal to two times the element pitch.

Figure 9:
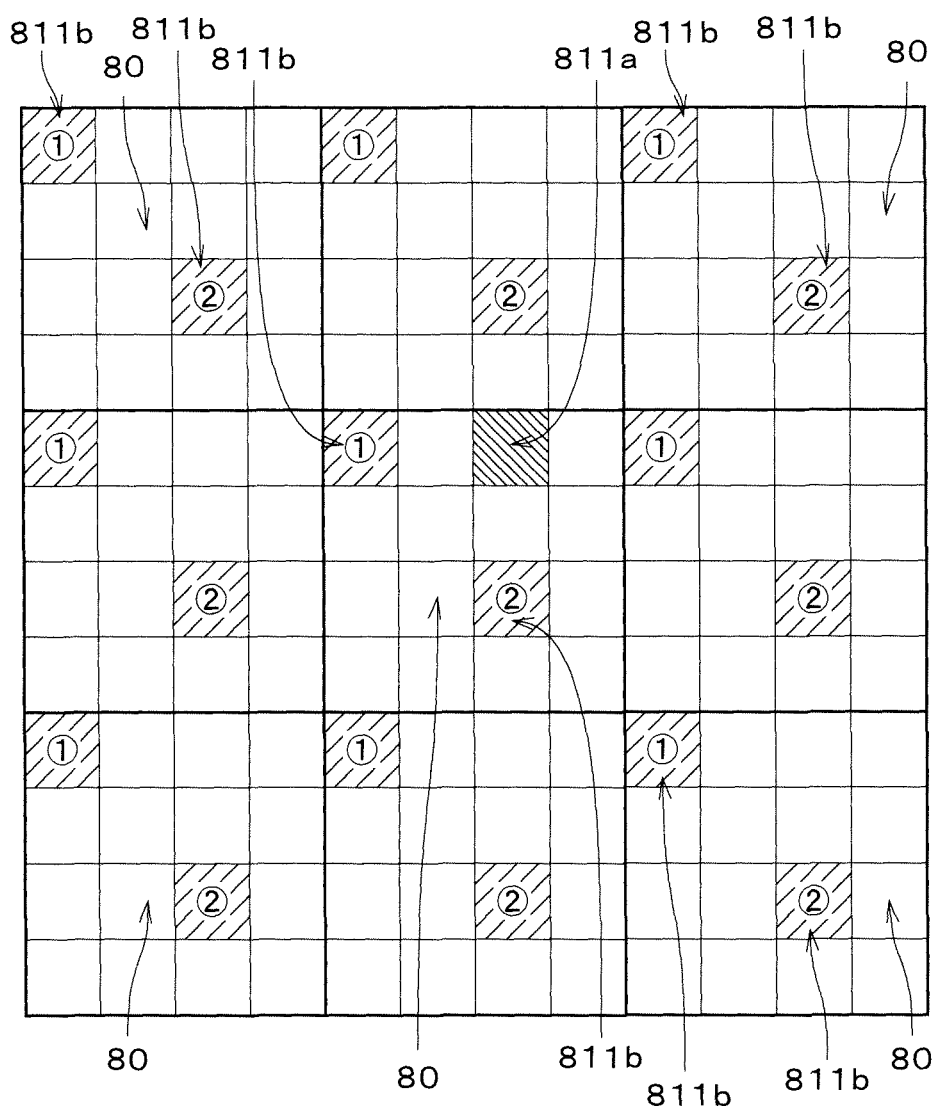
FIG. 9 illustrates a plurality of matrix areas.

In FIG. 9, the determined matrix elements 811b that are "1" in the turn-on order in the matrix areas 80 whose matrix numbers are 0 and 5 each satisfy the specific positional relationship with the selected undetermined matrix element 811a (hereinafter, referred to as the "undetermined matrix element 811a in FIG. 9"). Thus, as shown in Eq. 3, parts of Eq. 2 that correspond to these two determined matrix elements 811b are each multiplied by a correction coefficient (in the present embodiment, 3), thus yielding a corrected evaluation value element E. The corrected evaluation value element E is approximately 1.77.

$$E = \frac{1 \times 3}{2^2 + 0^2} + \frac{1}{6^2 + 4^2} + \frac{1}{2^2 + 4^2} + \frac{1}{2^2 + 4^2} + \quad \text{(Eq. 3)}$$
$$\frac{1}{6^2 + 0^2} + \frac{1 \times 3}{2^2 + 0^2} + \frac{1}{6^2 + 4^2} + \frac{1}{2^2 + 4^2} + \frac{1}{2^2 + 4^2}$$

Next, a temporary evaluation value element Etmp regarding the determined matrix elements 811b that are "2" in the turn-on order is obtained using the following Eq. 4 (step S221). This temporary evaluation value element Etmp is also approximately 0.77.

$$Etmp = \frac{1}{0^2 + 2^2} + \frac{1}{4^2 + 2^2} + \frac{1}{0^2 + 2^2} + \frac{1}{4^2 + 2^2} + \quad \text{(Eq. 4)}$$
$$\frac{1}{4^2 + 2^2} + \frac{1}{4^2 + 2^2} + \frac{1}{4^2 + 6^2} + \frac{1}{0^2 + 6^2} + \frac{1}{4^2 + 6^2}$$

The undetermined matrix element 811a in FIG. 9 satisfies the specific positional relationship with each of the determined matrix elements 811b that are "2" in the turn-on order in the matrix areas 80 whose matrix numbers are "0" and "2". Thus, parts of the temporary evaluation value element Etmp in Eq. 4 that correspond to the determined matrix elements 811b that are "2" in the turn-on order in the matrix areas 80 whose matrix numbers are "0" and "2" are multiplied by the correction coefficient, 3, thus yielding a corrected evaluation value element E as shown in Eq. 5 (steps S222 and S223). The corrected evaluation value element E is approximately 1.77.

$$Etmp = \frac{1 \times 3}{0^2 + 2^2} + \frac{1}{4^2 + 2^2} + \frac{1 \times 3}{0^2 + 2^2} + \frac{1}{4^2 + 2^2} + \quad \text{(Eq. 5)}$$

$$\frac{1}{4^2 + 2^2} + \frac{1}{4^2 + 2^2} + \frac{1}{4^2 + 6^2} + \frac{1}{0^2 + 6^2} + \frac{1}{4^2 + 6^2}$$

Then, the corrected evaluation value element E regarding the determined matrix elements 811b that are "1" in the turn-on order and the corrected evaluation value element E regarding the determined matrix elements 811b that are "2" in the turn-on order are totaled, yielding an evaluation value V of approximately 3.53 for the undetermined matrix element 811a in FIG. 9 (step S23). If the aforementioned correction were not performed, the evaluation value V would have been approximately 1.53. In other words, through the aforementioned correction, the evaluation value V for the undetermined matrix element 811a in FIG. 9 is increased and accordingly the undetermined matrix element 811a in FIG. 9 is less evaluated based on the evaluation value V.

Meanwhile, if an undetermined matrix element 811a that is located in the second column from the left and the second row from the top in the matrix area 80 whose matrix number is "0" (hereinafter, referred to as the "undetermined matrix element 811a in FIG. 10") has been selected in step S21, the undetermined matrix element being indicated by diagonal parallel lines different from those indicating the determined matrix elements 811b in FIG. 10, first, a temporary evaluation value element Etmp regarding the determined matrix elements 811b that are "1" in the turn-on order is obtained using Eq. 6 in the same manner as in the case of FIG. 9 (step S221). The temporary evaluation value element Etmp is approximately 0.91.

$$Etmp = \frac{1}{1^2 + 1^2} + \frac{1}{5^2 + 5^2} + \frac{1}{1^2 + 5^2} + \frac{1}{3^2 + 5^2} + \quad \text{(Eq. 6)}$$
$$\frac{1}{5^2 + 1^2} + \frac{1}{3^2 + 1^2} + \frac{1}{5^2 + 3^2} + \frac{1}{1^2 + 3^2} + \frac{1}{3^2 + 3^2}$$

Figure 10:
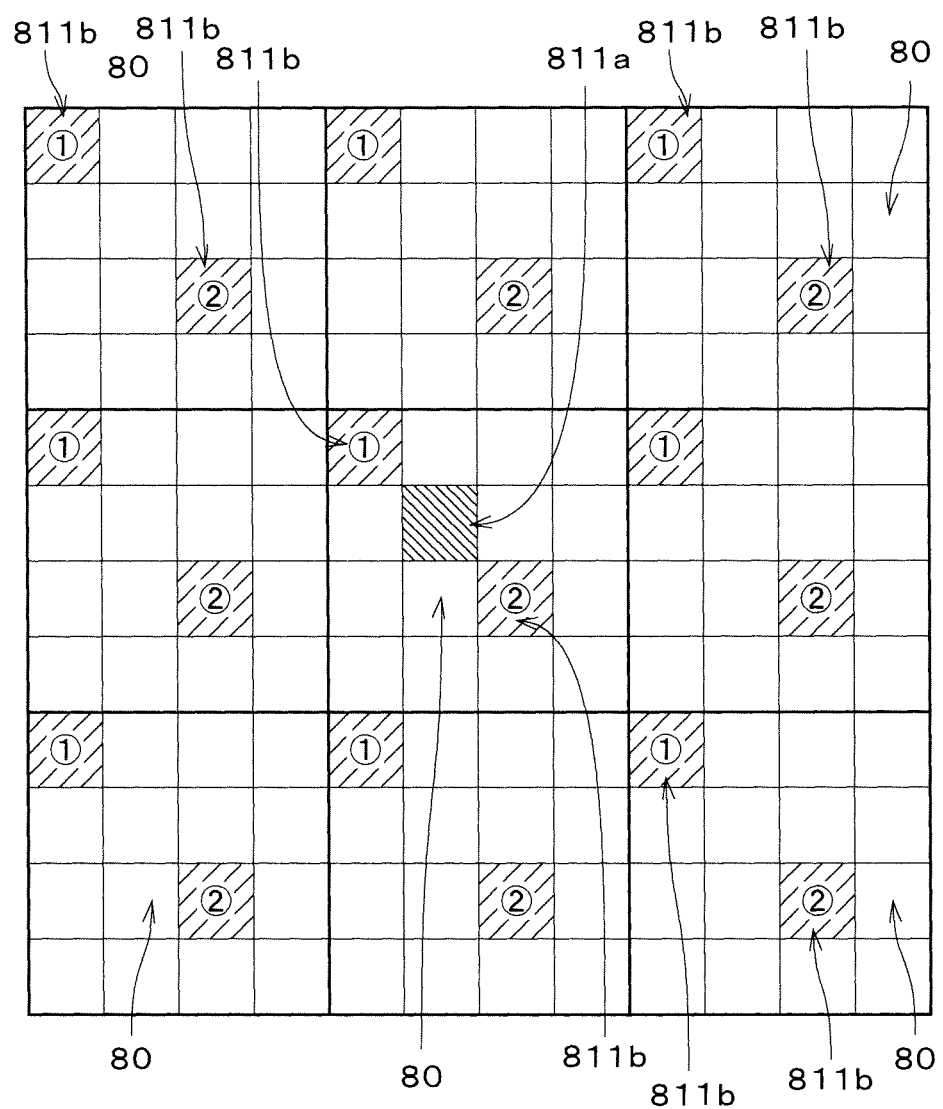
FIG. 10 illustrates a plurality of matrix areas.

In FIG. 10, because none of the determined matrix elements 811b satisfy the specific positional relationship with the undetermined matrix element 811a in FIG. 10, the temporary evaluation value element Etmp is not corrected and the evaluation value element E is set to a value equal to the temporary evaluation value element Etmp, i.e., approximately 0.91 (steps S222 and S224). In other words, the temporary evaluation value element Etmp is the evaluation value element E as-is.

Also, a temporary evaluation value element Etmp regarding the determined matrix elements 811b that are "2" in the turn-on order is obtained as shown in Eq. 7, and because none of the determined matrix elements 811b satisfy the specific positional relationship with the undetermined matrix element 811a in FIG. 10, the evaluation value element E is set to a value equal to the temporary evaluation value element Etmp, i.e., approximately 0.91 (steps S221, S222, and S224).

$$Etmp = \frac{1}{1^2 + 1^2} + \frac{1}{3^2 + 3^2} + \frac{1}{1^2 + 3^2} + \frac{1}{5^2 + 3^2} + \quad \text{(Eq. 7)}$$
$$\frac{1}{3^2 + 1^2} + \frac{1}{5^2 + 1^2} + \frac{1}{3^2 + 5^2} + \frac{1}{1^2 + 5^2} + \frac{1}{5^2 + 5^2}$$

Then, the corrected evaluation value element E regarding the determined matrix elements 811b that are "1" in the turn-on order and the corrected evaluation value element E regarding the determined matrix elements 811b that are "2" in the turn-on order are totaled, yielding an evaluation value V of approximately 1.82 for the undetermined matrix element 811*a* in FIG. 10 (step S23).

In step S24, the evaluation values V are obtained for all the undetermined matrix elements 811*a* including the undetermined matrix elements 811*a* in FIGS. 9 and 10 (step S24), and an undetermined matrix element 811*a* that is most highly evaluated based on the evaluation value V, i.e., an undetermined matrix element 811*a* with the smallest evaluation value V, is obtained. If the correction of step S223 were not performed, the evaluation value V for the undetermined matrix element 811*a* in FIG. 9 (approximately 1.53) would have been the smallest. However, as described above, the evaluation value V for the undetermined matrix element 811*a* in FIG. 9 is approximately 3.53 through the correction of step S223 and accordingly the evaluation value V for the undetermined matrix element 811*a* in FIG. 10 (approximately 1.82) is the smallest. As a result, the undetermined matrix element 811*a* in FIG. 10, i.e., the undetermined matrix element 811*a* that is located in the lower right of the determined matrix element 811*b* that is "1" in the turn order and the upper left of the determined matrix element 811*b* that is "2" in the turn-on order is determined to be the third "3" in the turn-on order (step S25).

Thereafter, steps S21 to S25 are repeated until the positions of all the undetermined matrix elements 811*a* in the turn-on order are determined (step S26). Then, the threshold value of each matrix element 811 in the matrix area 80 is determined in accordance with the determined turn-on order of all the matrix elements 811 in the matrix area 80 (step S27). In the present embodiment, the threshold values are acquired by normalizing the turn-on order based on the number of tones of the image recorded on a recording medium 9, and the acquired threshold values are given to the respective matrix elements 811.

As described above, the threshold matrix generation part 43 of the image recording apparatus 1 obtains the temporary evaluation value element Etmp based on the distance in the row direction between the undetermined matrix element 811*a* and each of the determined matrix elements 811*b* and the distance in the column direction therebetween, and obtains the evaluation value element E after, if the positional relationship between the undetermined matrix element 811*a* and any of the determined matrix elements 811*b* is the specific positional relationship (i.e., such a positional relationship that the undetermined matrix element 811*a* and any of the determined matrix elements 811*b* are located in the same position with respect to the row direction or the column direction), correcting the temporary evaluation value element Etmp such that the undetermined matrix element 811*a* is less evaluated based on the evaluation value V. Through this, it is possible to provide a threshold matrix that suppresses the occurrence of a grid-like dot pattern when images are recorded on the recording media 9.

As described above, the specific positional relationship further includes a condition that the distance between the undetermined matrix element 811*a* and each of the determined matrix elements 811*b* is two times the element pitch. Accordingly, it is possible to provide a threshold matrix that suppresses the occurrence of a grid-like dot pattern in which dots are arranged spaced apart from one another by a distance equal to two times the element pitch in the row and column directions.

Figure 11:
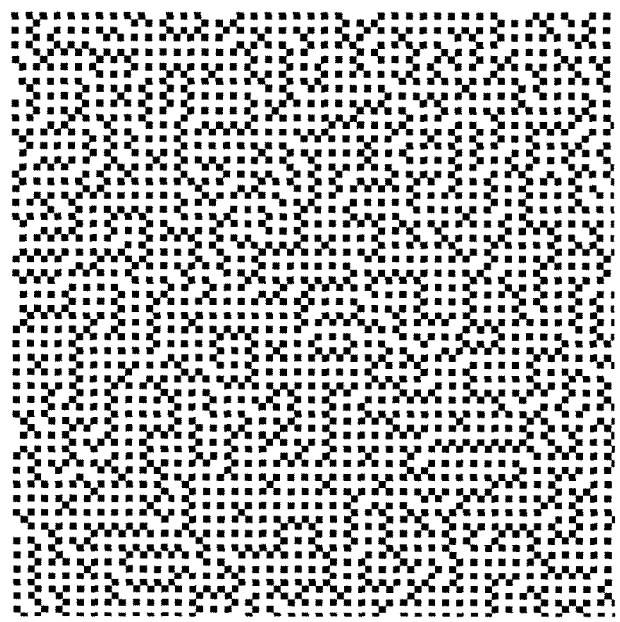
FIG. 11 illustrates an image recorded by a comparative image recording apparatus.
Figure 12:
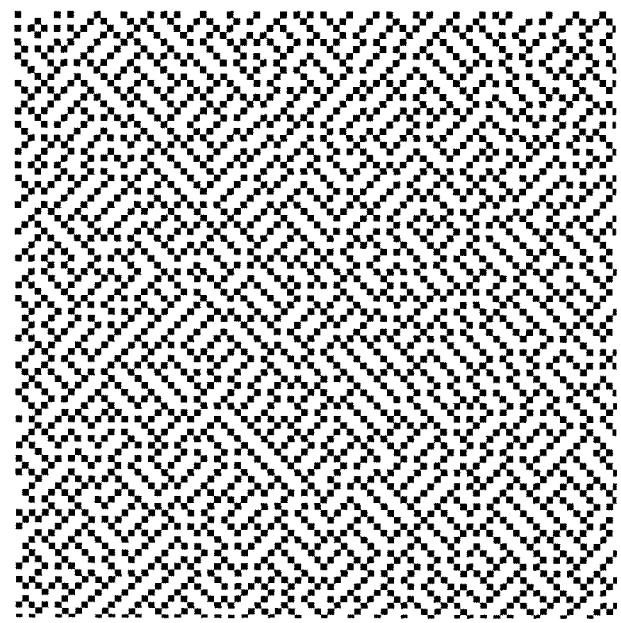
FIG. 12 illustrates an image recorded by the image recording apparatus of the embodiment.

FIG. 11 illustrates an image recorded by an image recording apparatus that does not perform the correction of step S223 (hereinafter, referred to as a "comparative image recording apparatus"), and FIG. 12 illustrates an image recorded by the image recording apparatus 1 according to the present embodiment. The images in FIGS. 11 and 12 are tint images that have a tone value of 77 (30% tone value).

As shown in FIG. 11, the image recorded by the comparative image recording apparatus feels unnatural to a viewer of the image as if areas where dots are arranged in a grid are embossed on surrounding areas. Also, because a large number of areas where dots are arranged in a gird are present in the image recorded by the comparative image recording apparatus, these areas are adjacent to one another and the boundaries therebetween are visually recognized as lines. As a result, the image feels unnatural to the viewer as if there are a large number of unclear short lines over a wide range of the image. In contrast, with the image shown in FIG. 12, the occurrence of a grid-like dot pattern is suppressed and accordingly it is possible to prevent a viewer from having the aforementioned unnatural feeling to the image.

Figure 13:
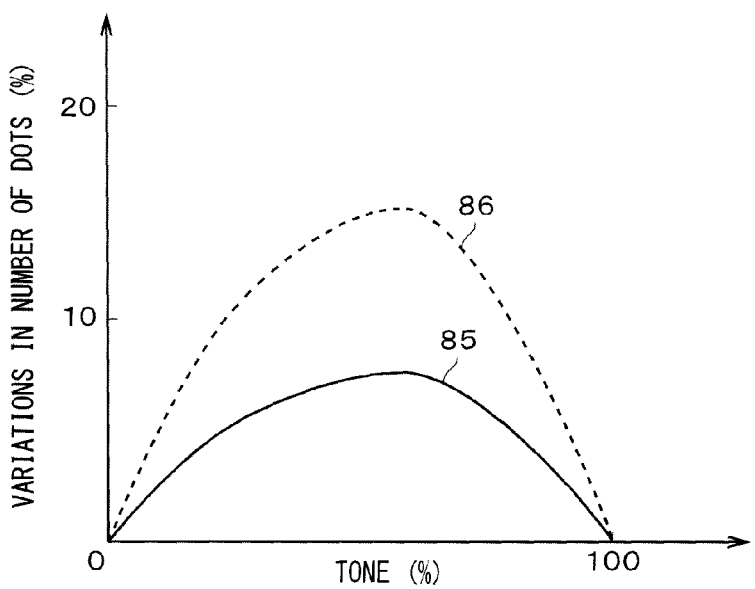
FIG. 13 illustrates variations in the number of dots.

FIG. 13 illustrates the relationship between the tone of the image recorded by the image recording apparatus 1 and variations in the number of dots in the row direction. The horizontal axis in FIG. 13 indicates the rate of each tone value to the maximum tone value. A solid line 85 indicates variations in the number of dots in the row direction of the image recorded by the image recording apparatus 1. In FIG. 13, variations in the number of dots in the row direction of the image recorded by the comparative image recording apparatus are also indicated by a broken line 86. The variations in the number of dots in the row direction can be obtained by first obtaining a rendering rate for each column of a recorded image (i.e., a rate obtained by dividing the number of dots formed in each column by the number of pixels in the column) and then obtaining a difference between the maximum and minimum values of the rendering rate in every column. In the image recording apparatus 1 according to the present embodiment, because the occurrence of a grid-like dot pattern can be suppressed as described above, it is also possible to reduce variations in the number of dots in the row direction for each tone.

The above-described threshold matrix generation method is also suitable for the generation of a threshold matrix performed in an image recording apparatus in which pixels where dots can be formed are arranged in a checkered pattern (i.e., pixels where dots can be formed and pixels where dots are not formed are alternately arranged in both the row and column directions), as shown in Japanese Patent Application Laid-Open No. 2009-61727, the disclosure of which is herein incorporated by reference.

Figure 6B:
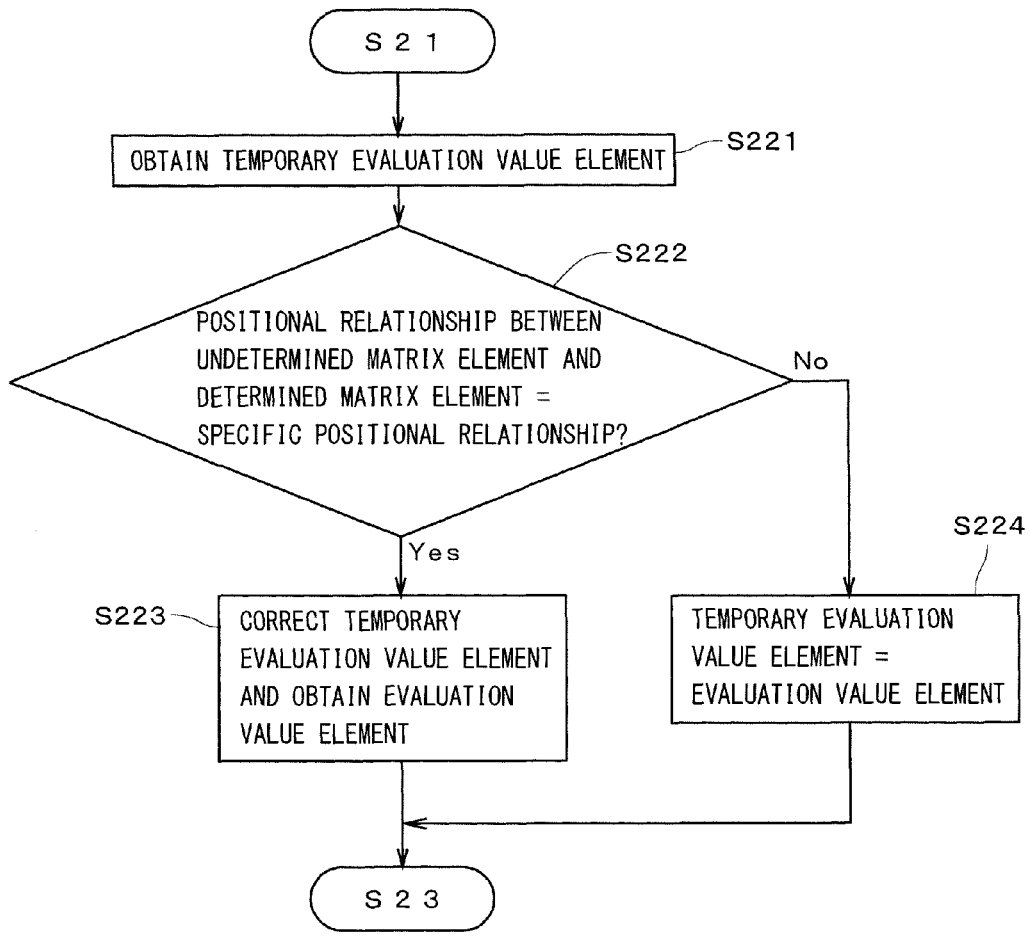
FIG. 6B is a flowchart of part of the processing for generating a threshold matrix.
Figure 7:
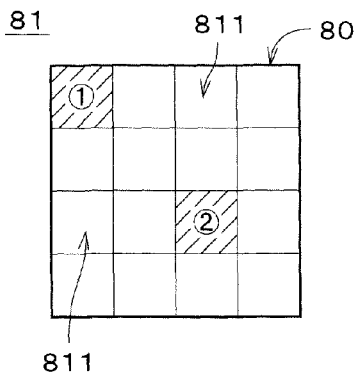
FIG. 7 illustrates a matrix area.
Figure 14:
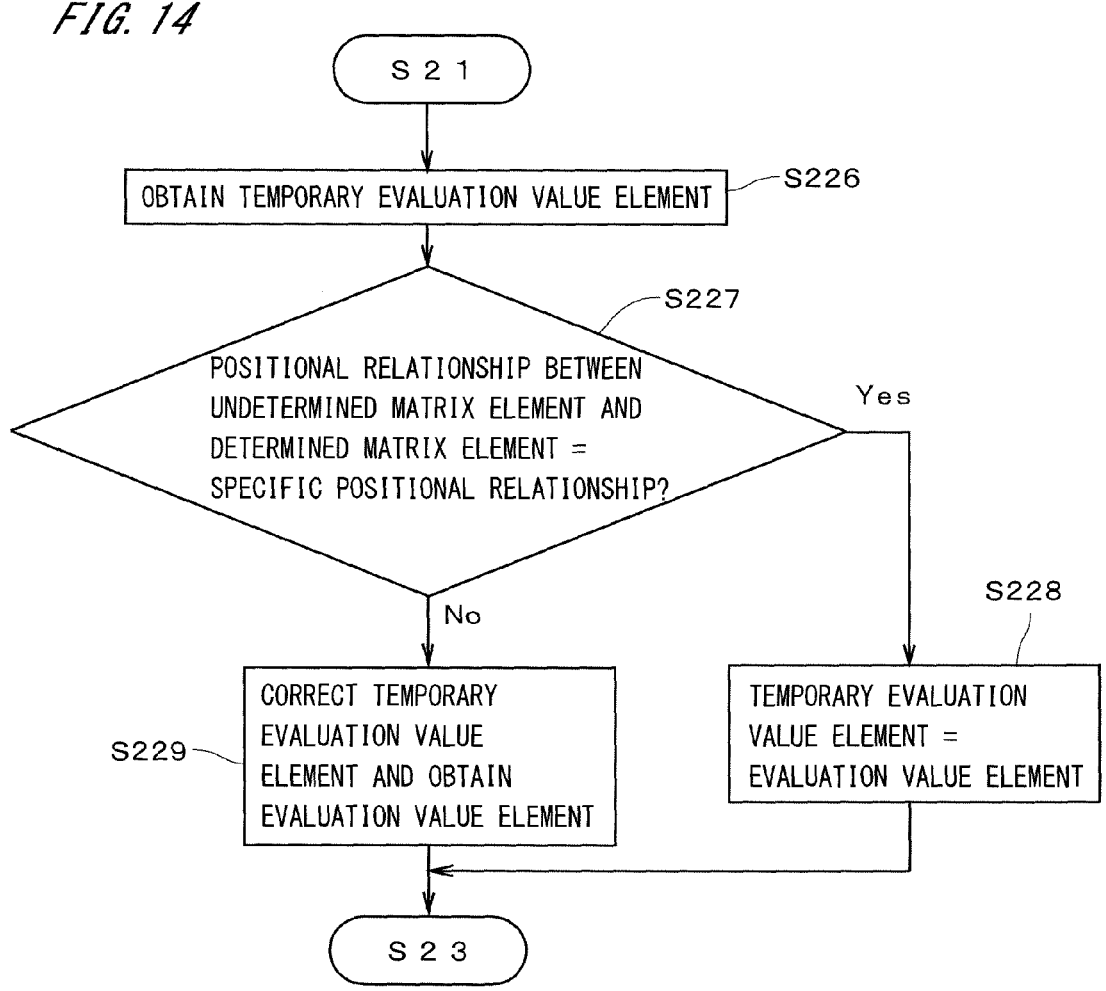
FIG. 14 is a flowchart of part of the processing for generating a threshold matrix.

In the image recording apparatus 1, as shown in FIG. 14, steps S226 to S229 may be performed instead of steps S221 to S224 shown in FIG. 6B. In step S226, the temporary evaluation value element Etmp is obtained based on the distance in the column direction between the undetermined matrix element 811*a* and each of the determined matrix elements 811*b* and the distance in the row direction therebetween in the same manner as in step S221 (step S226). Then, it is determined whether or not the positional relationship between any of the determined matrix elements 811*b* and the undetermined matrix element 811*a* is the aforementioned specific positional relationship (step S227), and if it is the specific positional relationship, the temporary evaluation value element Etmp is the evaluation value element E as-is (step S228).

On the other hand, if the positional relationship between any of the determined matrix elements 811*b* and the undetermined matrix element 811*a* is not the specific positional relationship, the temporary evaluation value element Etmp regarding the determined matrix elements 811*b* is corrected so that the undetermined matrix element 811*a* is more highly evaluated based on the evaluation value V (in the present embodiment, the evaluation value V is reduced) (step S229).

For example, for the undetermined matrix element 811*a* indicated by diagonal parallel lines in FIG. 9, the determined matrix elements 811*b* that are "1" in the turn-on order in the matrix areas 80 whose matrix numbers are "0" and "5" each satisfy the specific positional relationship. Thus, in the above Eq. 2 indicating the temporary evaluation value element Etmp (approximately 0.77), parts that correspond to the determined matrix elements 811*b* that are "1" in the turn-on order in the matrix areas 80 whose matrix numbers are "1" to "4" and "6" to "8" are multiplied by a correction coefficient (in the present embodiment, 0.3) as shown in Eq. 8, thus yielding a corrected evaluation value element E. The corrected evaluation value element E is approximately 0.58.

$$E = \frac{1}{2^2 + 0^2} + \frac{1 \times 0.3}{6^2 + 4^2} + \frac{1 \times 0.3}{2^2 + 4^2} + \frac{1 \times 0.3}{2^2 + 4^2} + \\ \frac{1 \times 0.3}{6^2 + 0^2} + \frac{1}{2^2 + 0^2} + \frac{1 \times 0.3}{6^2 + 4^2} + \frac{1 \times 0.3}{2^2 + 4^2} + \frac{1 \times 0.3}{2^2 + 4^2} \quad \text{(Eq. 8)}$$

The undetermined matrix element 811*a* in FIG. 9 is also in the specific positional relationship with each of the determined matrix elements 811*b* that are "2" in the turn-on order in the matrix areas 80 whose matrix numbers are "0" and "2". Thus, in the above Eq. 4 indicating the temporary evaluation value element Etmp (approximately 0.77), parts that correspond to the determined matrix elements 811*b* that are "2" in the turn-on order in the matrix areas 80 whose matrix numbers are "1" and "3" to "8" are multiplied by the correction coefficient, 0.3, as shown in Eq. 9, thus yielding a corrected evaluation value element E. The corrected evaluation value element E is approximately 0.58.

$$E = \frac{1}{0^2 + 2^2} + \frac{1 \times 0.3}{4^2 + 2^2} + \frac{1}{0^2 + 2^2} + \frac{1 \times 0.3}{4^2 + 2^2} + \\ \frac{1 \times 0.3}{4^2 + 2^2} + \frac{1 \times 0.3}{4^2 + 2^2} + \frac{1 \times 0.3}{4^2 + 6^2} + \frac{1 \times 0.3}{0^2 + 6^2} + \frac{1 \times 0.3}{4^2 + 6^2} \quad \text{(Eq. 9)}$$

Then, the corrected evaluation value element E regarding the determined matrix elements 811*b* that are "1" in the turn-on order and the corrected evaluation value element E regarding the determined matrix elements 811*b* that are "2" in the turn-on order are totaled, yielding an evaluation value V of approximately 1.16 for the undetermined matrix element 811*a* in FIG. 9 (step S23). If the aforementioned correction were not performed, the evaluation value V would have been approximately 1.53. Thus, through the aforementioned correction, the evaluation value V for the undetermined matrix element 811*a* in FIG. 9 is slightly reduced and accordingly, the undetermined matrix element 811*a* is more highly evaluated based on the evaluation value V.

Meanwhile, for the undetermined matrix element 811*a* indicated by diagonal parallel lines in FIG. 10, none of the determined matrix elements 811*b* that are "1" in the turn-on order in all the matrix areas 80 whose matrix numbers are "0" to "8" satisfy the specific positional relationship. Thus, all parts of the temporary evaluation value element Etmp (approximately 0.91) in the above Eq. 6 are multiplied by the correction coefficient, 0.3, as shown in Eq. 10, yielding a corrected evaluation value element E. The corrected evaluation value element E is approximately 0.27.

$$E = \frac{1 \times 0.3}{1^2 + 1^2} + \frac{1 \times 0.3}{5^2 + 5^2} + \frac{1}{1^2 + 5^2} + \frac{1 \times 0.3}{3^2 + 5^2} + \\ \frac{1 \times 0.3}{5^2 + 1^2} + \frac{1 \times 0.3}{3^2 + 1^2} + \frac{1 \times 0.3}{5^2 + 3^2} + \frac{1 \times 0.3}{1^2 + 3^2} + \frac{1 \times 0.3}{3^2 + 3^2} \quad \text{(Eq. 10)}$$

The undetermined matrix element 811*a* in FIG. 10 is also not in the specific positional relationship with any of the determined matrix elements 811*b* that are "2" in the turn-on order in all the matrix areas 80 whose matrix numbers are "0" to "8". Thus, all parts of the temporary evaluation value element Etmp (approximately 0.91) in the above Eq. 7 are multiplied by the correction coefficient, 0.3, as shown in Eq. 11, yielding a corrected evaluation value element E. The corrected evaluation value element E is approximately 0.27.

$$E = \frac{1 \times 0.3}{1^2 + 1^2} + \frac{1 \times 0.3}{3^2 + 3^2} + \frac{1 \times 0.3}{1^2 + 3^2} + \frac{1 \times 0.3}{5^2 + 3^2} + \\ \frac{1 \times 0.3}{3^2 + 1^2} + \frac{1 \times 0.3}{5^2 + 1^2} + \frac{1 \times 0.3}{3^2 + 5^2} + \frac{1 \times 0.3}{1^2 + 5^2} + \frac{1 \times 0.3}{5^2 + 5^2} \quad \text{(Eq. 11)}$$

Then, the corrected evaluation value element E regarding the determined matrix elements 811*b* that are "1" in the turn-on order and the corrected evaluation value element E regarding the determined matrix elements 811*b* that are "2" in the turn-on order are totaled, yielding an evaluation value V of approximately 0.55 for the undetermined matrix element 811*a* in FIG. 10 (step S23). If the aforementioned correction were not performed, the evaluation value V would have been approximately 1.82. Thus, through the aforementioned correction, the evaluation value V for the undetermined matrix element 811*a* in FIG. 10 is reduced and accordingly the undetermined matrix element 811*a* is more highly evaluated based on the evaluation value V.

Thereafter, as described above, the evaluation values V are obtained for all the undetermined matrix elements 811*a* including the undetermined matrix elements 811*a* in FIGS. 9 and 10 (step S24), and an undetermined matrix element 811*a* that is most highly evaluated based on the evaluation value V, i.e., an undetermined matrix element 811*a* with the smallest evaluation value V is obtained.

If the correction of step S229 were not performed, the evaluation value V for the undetermined matrix element 811*a* in FIG. 9 (approximately 1.53) would have been the smallest. However, as described above, the evaluation value V for the undetermined matrix element 811*a* in FIG. 9 is approximately 1.16 and the evaluation value V for the undetermined matrix element 811*a* in FIG. 10 is approximately 0.55 as a result of the correction of step S229. Thus, the evaluation value V for the undetermined matrix element 811*a* in FIG. 10 is the smallest. Accordingly, as in the case where the correction illustrated in FIG. 6B is performed, the undetermined matrix element 811*a* in FIG. 10 is determined to be the third "3" in the turn-on order (step S25).

Through this, as described above, it is possible to provide a threshold matrix that suppresses the occurrence of a grid-like dot pattern when an image is recorded on a recording medium 9, and in particular, a threshold matrix that suppresses the occurrence of a grid-like dot pattern in which dots are arranged spaced apart from one another by a distance equal to two times the element pitch in the row and column directions.

In the image recording apparatus 1, the correction in FIG. 6B and the correction in FIG. 14 may both be performed on the temporary evaluation value element Etmp. Specifically, the evaluation value element E may be obtained by, if the undetermined matrix element 811*a* is in the specific positional relationship with any of the determined matrix elements 811*b* when the repetitive application of a threshold matrix is taken into consideration, correcting the temporary evaluation value element Etmp regarding the determined matrix element 811*b* so that the undetermined matrix element 811*a* is less evaluated based on the evaluation value V, and if the undetermined matrix element 811*a* is not in the specific positional relationship with any of the determined matrix elements 811*b* when the repetitive application of a threshold matrix is taken into consideration, correcting the temporary evaluation value element Etmp regarding the determined matrix element 811*b* so that the undetermined matrix element 811*a* is more highly evaluated based on the evaluation value V.

The specific positional relationship in the image recording apparatus 1 is not limited to the aforementioned positional relationship, and it is sufficient for the specific positional relationship to be such a relationship that any of the determined matrix elements 811*b* is located in the same position as the undetermined matrix element 811*a* with respect to the row direction or the column direction. In this case, it is possible to provide a threshold matrix that suppresses the occurrence of a grid-like dot pattern when an image is recorded on a recording medium 9. Alternatively, the specific positional relationship may further include a condition that the distance between each determined matrix element 811*b* and the undetermined matrix element 811*a* is less than or equal to a predetermined distance. In this case, it is possible to provide a threshold matrix that suppresses the occurrence of a grid-like dot pattern in which dots are arranged spaced apart from one another by a distance less than or equal to the predetermined distance in the row and column directions.

Figure 15:
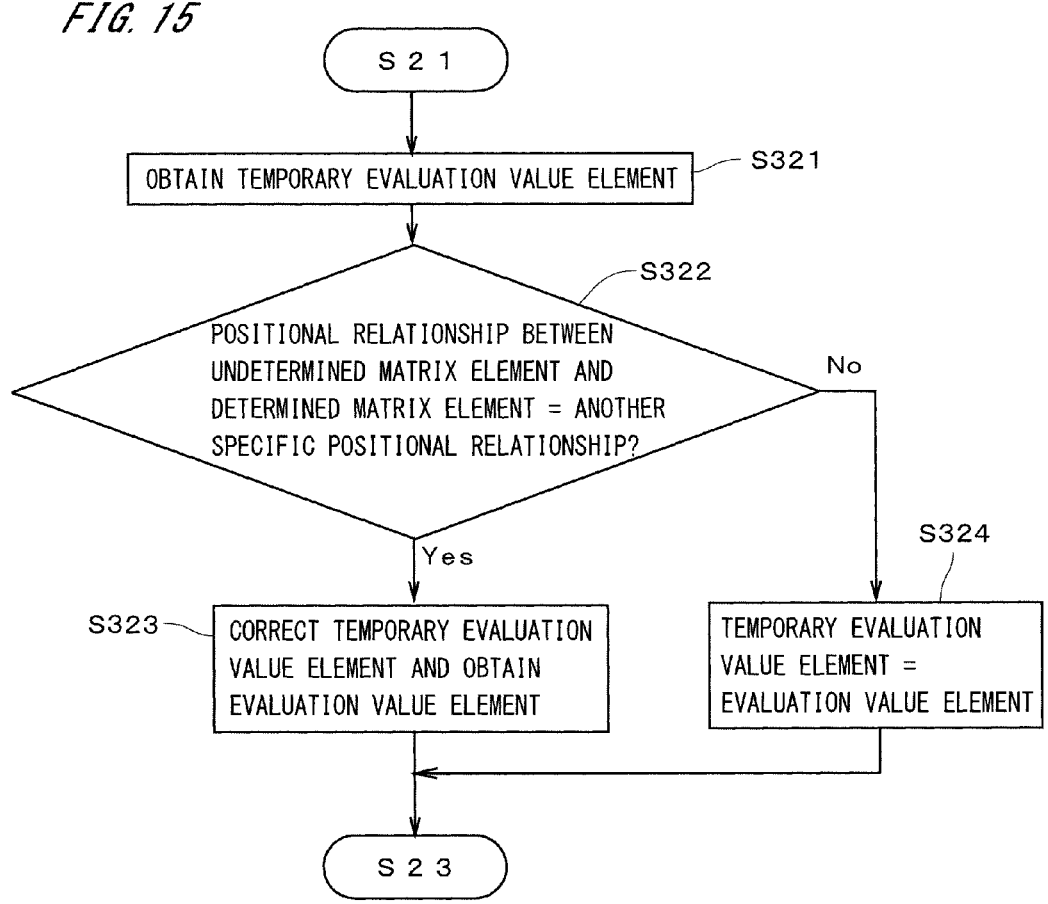
FIG. 15 is a flowchart of part of the processing for generating a threshold matrix.

In the image recording apparatus 1, as shown in FIG. 15, steps S321 to S324 may be performed instead of steps S221 to S224 shown in FIG. 6B. In step S321, the temporary evaluation value element Etmp is obtained based on the distance in the column direction between the undetermined matrix element 811*a* and each of the determined matrix elements 811*b* and the distance in the row direction therebetween in the same manner as in step S221.

In step S322, it is determined whether or not the positional relationship between the undetermined matrix element 811*a* and any of the determined matrix elements 811*b* is another specific positional relationship that is different from the specific positional relationship in step S222. The other specific positional relationship in step S322 is such a positional relationship that an angle formed by the row direction and a direction in which a linear area that includes the determined matrix element 811*b* and the undetermined matrix element 811*a* extends is 45 degrees (i.e., the distance dxi in the row direction between the determined matrix element 811*b* and the undetermined matrix element 811*a* is equal to the distance dyi in the column direction therebetween), and the distance dxi in the row direction between the determined matrix element 811*b* and the undetermined matrix element 811*a* and the distance dyi in the column direction therebetween are each equal to the element pitch.

If the positional relationship between the determined matrix element 811*b* and the undetermined matrix element 811*a* is the aforementioned other specific positional relationship, the temporary evaluation value element Etmp regarding the determined matrix element 811*b* is corrected so that the undetermined matrix element 811*a* is more highly evaluated based on the evaluation value V (in the present embodiment, the evaluation value V is reduced) (step S323). If the positional relationship is not the other specific positional relationship, the temporary evaluation value element Etmp is the evaluation value element E as-is (step S324).

For example, for the undetermined matrix element 811*a* indicated by diagonal parallel lines in FIG. 9, none of the determined matrix elements 811*b* that are "1" in the turn-on order in all the matrix areas 80 whose matrix numbers are "0" to "8" satisfy the aforementioned other specific positional relationship. Thus, the temporary evaluation value element Etmp shown in Eq. 2 is not corrected and accordingly the evaluation value element E is set to a value equal to the temporary evaluation value element Etmp, i.e., approximately 0.77. In other words, the temporary evaluation value element Etmp is the evaluation value element E as-is.

The undetermined matrix element 811*a* in FIG. 9 is also not in the other specific positional relationship with any of the determined matrix elements 811*b* that are "2" in the turn-on order in all the matrix areas 80 whose matrix numbers are "0" to "8". Thus, the temporary evaluation value element Etmp shown in Eq. 4 is not corrected and accordingly the evaluation value element E is set to a value equal to the temporary evaluation value element Etmp, i.e., approximately 0.77. Then, the corrected evaluation value element E regarding the determined matrix elements 811*b* that are "1" in the turn-on order and the corrected evaluation value element E regarding the determined matrix elements 811*b* that are "2" in the turn-on order are totaled, yielding an evaluation value V of approximately 1.53 for the undetermined matrix element 811*a* in FIG. 9 (step S23).

Meanwhile, for the undetermined matrix element 811*a* indicated by diagonal parallel lines in FIG. 10, the determined matrix element 811*b* that is "1" in the turn-on order in the matrix area 80 whose matrix number is "0" satisfies the aforementioned other specific positional relationship. Thus, a part of the temporary evaluation value element Etmp (approximately 0.91) in the above Eq. 6 that corresponds to the single determined matrix element 811*b* is multiplied by the correction coefficient (in the present embodiment, 0.3) as shown in Eq. 12, yielding a corrected evaluation value element E. The corrected evaluation value element E is approximately 0.56.

$$E = \frac{1 \times 0.3}{1^2 + 1^2} + \frac{1}{5^2 + 5^2} + \frac{1}{1^2 + 5^2} + \frac{1}{3^2 + 5^2} + \\ \frac{1}{5^2 + 1^2} + \frac{1}{3^2 + 1^2} + \frac{1}{5^2 + 3^2} + \frac{1}{1^2 + 3^2} + \frac{1}{3^2 + 3^2}$$ (Eq. 12)

The undetermined matrix element 811*a* in FIG. 10 is also in the aforementioned other specific positional relationship with the determined matrix element 811*b* that is "2" in the turn-on order in the matrix area 80 whose matrix number is "0". Thus, a part of the temporary evaluation value element Etmp (approximately 0.91) in the above Eq. 7 that corresponds to the single determined matrix element 811*b* is multiplied by the correction coefficient, 0.3, as shown in Eq. 13, yielding a corrected evaluation value element E. The corrected evaluation value element E is approximately 0.56.

$$E = \frac{1 \times 0.3}{1^2 + 1^2} + \frac{1}{3^2 + 3^2} + \frac{1}{1^2 + 3^2} + \frac{1}{5^2 + 3^2} + \\ \frac{1}{3^2 + 1^2} + \frac{1}{5^2 + 1^2} + \frac{1}{3^2 + 5^2} + \frac{1}{1^2 + 5^2} + \frac{1}{5^2 + 5^2}$$ (Eq. 13)

Then, the corrected evaluation value element E regarding the determined matrix elements 811*b* that are "1" in the turn-on order and the corrected evaluation value element E regarding the determined matrix elements 811b that are "2" in the turn-on order are totaled, yielding an evaluation value V of approximately 1.12 for the undetermined matrix element 811a in FIG. 10 (step S23). If the aforementioned correction were not performed, the evaluation value V would have been approximately 1.82. Thus, through the aforementioned correction, the evaluation value V for the undetermined matrix element 811a in FIG. 10 is reduced and accordingly the undetermined matrix element 811a is more highly evaluated based on the evaluation value V.

Thereafter, as described above, the evaluation values V are obtained for all the undetermined matrix elements 811a including the undetermined matrix elements 811a in FIGS. 9 and 10 (step S24), and an undetermined matrix element 811a that is most highly evaluated based on the evaluation value V, i.e., an undetermined matrix element 811a with the smallest evaluation value V is obtained. If the correction of step S323 were not performed, the evaluation value V for the undetermined matrix element 811a in FIG. 9 (approximately 1.53) would have been the smallest. However, through the correction of the step S323 as described above, the evaluation value V for the undetermined matrix element 811a in FIG. 10 is approximately 1.12, which is the smallest. Accordingly, as in the case where the correction in FIG. 6B is performed, the undetermined matrix element 811a in FIG. 10 is determined to be the third "3" in the turn-on order (step S25).

Through this, it is possible to provide a threshold matrix that suppresses the occurrence of a grid-like dot pattern when an image is recorded on a recording medium 9 and in which dots are readily arranged in an arrangement direction that forms an angle of 45 degrees with the row direction. It is also possible to provide a threshold matrix in which, when dots are arranged in the above arrangement direction, the distance in the row direction between dots and the distance in the column direction therebetween are each likely to be equal to the element pitch.

Figure 16:
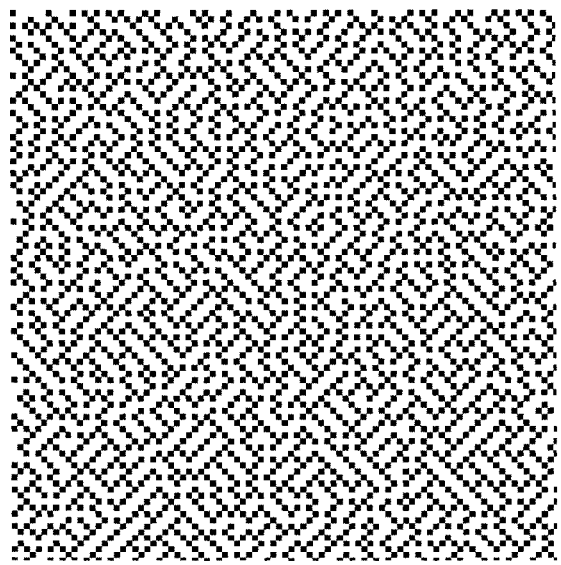
FIG. 16 illustrates an image recorded by an image recording apparatus of an embodiment.

FIG. 16 illustrates an image recorded by the image recording apparatus 1 when the correction of step S323 has been performed. As in FIGS. 11 and 12, the image in FIG. 16 is also a tint image that has a tone value of 77 (30% tone value). In the image shown in FIG. 16, the occurrence of a grid-like dot pattern is suppressed as compared with the image of FIG. 11 recorded by the comparative image recording apparatus. Thus, it is possible to prevent a viewer of the image from having the aforementioned unnatural feeling to the image.

Furthermore, by performing the correction shown in FIG. 15, it is also possible to reduce variations in the number of dots in the row direction for each tone as in the case where the correction in FIG. 6B is performed. The threshold matrix generation method in which the correction shown in FIG. 15 is performed is also suitable for the generation of a threshold matrix performed by the image recording apparatus in which pixels where dots can be formed are arranged in a checkered pattern.

Figure 17:
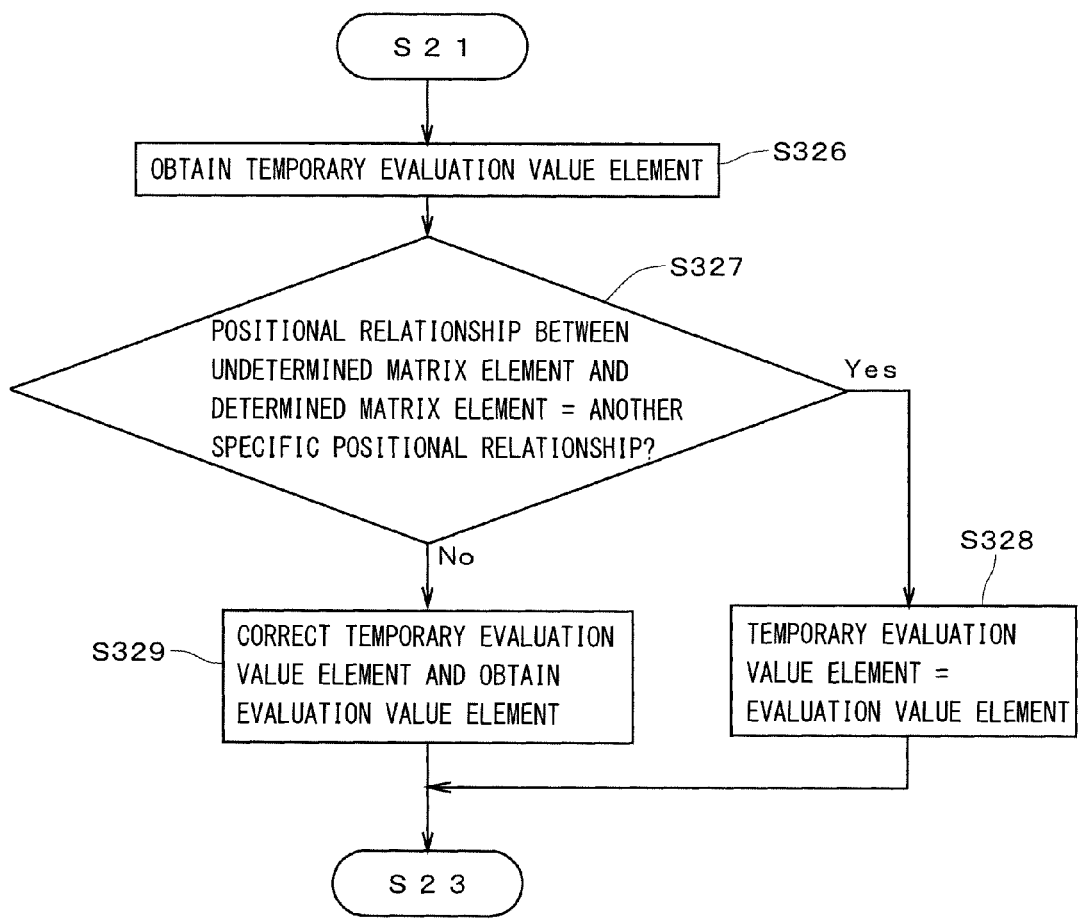
FIG. 17 is a flowchart of part of the processing for generating a threshold matrix.

In the image recording apparatus 1, as shown in FIG. 17, steps S326 to S329 may be performed instead of steps S321 to S324 shown in FIG. 15. In step S326, the temporary evaluation value element Etmp is obtained based on the distance in the column direction between the undetermined matrix element 811a and each of the determined matrix elements 811b and the distance in the row direction therebetween in the same manner as in step S321. Then, it is determined whether or not the positional relationship between any of the determined matrix elements 811b and the undetermined matrix element 811a is the aforementioned other specific positional relationship (step S327), and if it is the other specific positional relationship, the temporary evaluation value element Etmp is the evaluation value element E as-is (step S328).

On the other hand, if the positional relationship between the determined matrix element 811b and the undetermined matrix element 811a is not the other specific positional relationship, the temporary evaluation value element Etmp regarding the determined matrix elements 811b is corrected so that the undetermined matrix element 811a is less evaluated based on the evaluation value V (in the present embodiment, the evaluation value V is increased) (step S329).

For example, for the undetermined matrix element 811a indicated by diagonal parallel lines in FIG. 9, none of the determined matrix elements 811b that are "1" in the turn-on order in all the matrix areas 80 whose matrix numbers are "0" to "8" satisfy the aforementioned other specific positional relationship. Thus, all parts of the temporary evaluation value element Etmp (approximately 0.77) in Eq. 2 are multiplied by the correction coefficient (in the present embodiment, 3) as shown in Eq. 14, yielding a corrected evaluation value element E. The corrected evaluation value element E is approximately 2.31.

$$E = \frac{1 \times 3}{2^2 + 0^2} + \frac{1 \times 3}{6^2 + 4^2} + \frac{1 \times 3}{2^2 + 4^2} + \frac{1 \times 3}{2^2 + 4^2} + \\ \frac{1 \times 3}{6^2 + 0^2} + \frac{1 \times 3}{2^2 + 0^2} + \frac{1 \times 3}{6^2 + 4^2} + \frac{1 \times 3}{2^2 + 4^2} + \frac{1 \times 3}{2^2 + 4^2}$$ (Eq. 14)

The undetermined matrix element 811a in FIG. 9 is also not in the other specific positional relationship with any of the determined matrix elements 811b that are "2" in the turn-on order in all the matrix areas 80 whose matrix numbers are "0" to "8". Thus, all parts of the temporary evaluation value element Etmp (approximately 0.77) in Eq. 4 are multiplied by the correction coefficient, 3, as shown in Eq. 15, yielding a corrected evaluation value element E. The corrected evaluation value element E is approximately 2.31.

$$E = \frac{1 \times 3}{0^2 + 2^2} + \frac{1 \times 3}{4^2 + 2^2} + \frac{1 \times 3}{0^2 + 2^2} + \frac{1 \times 3}{4^2 + 2^2} + \\ \frac{1 \times 3}{4^2 + 2^2} + \frac{1 \times 3}{4^2 + 2^2} + \frac{1 \times 3}{4^2 + 6^2} + \frac{1 \times 3}{0^2 + 6^2} + \frac{1 \times 3}{4^2 + 6^2}$$ (Eq. 15)

Then, the corrected evaluation value element E regarding the determined matrix elements 811b that are "1" in the turn-on order and the corrected evaluation value element E regarding the determined matrix elements 811b that are "2" in the turn-on order are totaled, yielding an evaluation value V of approximately 4.62 for the undetermined matrix element 811a in FIG. 9 (step S23). If the aforementioned correction were not performed, the evaluation value V would have been approximately 1.53. Thus, through the aforementioned correction, the evaluation value V for the undetermined matrix element 811a in FIG. 9 is increased and accordingly the undetermined matrix element 811a is less evaluated based on the evaluation value V.

Meanwhile, for the undetermined matrix element 811a indicated by diagonal parallel lines in FIG. 10, the determined matrix element 811b that is "1" in the turn-on order in the matrix area 8 whose matrix number is "0" satisfies the other specific positional relationship. Thus, parts of the temporary evaluation value element Etmp (approximately 0.91) in the above Eq. 6 that correspond to the determined matrix elements 811b that are "1" in the turn-on order in the matrix areas 80 whose matrix numbers are "1" to "8" are multiplied by the correction coefficient, 3, as shown in Eq. 16, yielding a corrected evaluation value element E. The corrected evaluation value element E is approximately 1.73.

$$E = \frac{1}{1^2+1^2} + \frac{1\times 3}{5^2+5^2} + \frac{1\times 3}{1^2+5^2} + \frac{1\times 3}{3^2+5^2} + \\ \frac{1\times 3}{5^2+1^2} + \frac{1\times 3}{3^2+1^2} + \frac{1\times 3}{5^2+3^2} + \frac{1\times 3}{1^2+3^2} + \frac{1\times 3}{3^2+3^2}$$ (Eq. 16)

The undetermined matrix element 811*a* in FIG. 10 is also in the other specific positional relationship with the determined matrix element 811*b* that is "2" in the turn-on order in the matrix area 80 whose matrix number is "0". Thus, parts of the temporary evaluation value element Etmp (approximately 0.91) in the above Eq. 7 that correspond to the determined matrix elements 811*b* that are "2" in the turn-on order in the matrix areas 80 whose matrix numbers are "1" to "8" are multiplied by the correction coefficient, 3, as shown in Eq. 17, yielding a corrected evaluation value element E. The corrected evaluation value element E is approximately 1.73.

$$E = \frac{1}{1^2+1^2} + \frac{1\times 3}{3^2+3^2} + \frac{1\times 3}{1^2+3^2} + \frac{1\times 3}{5^2+3^2} + \\ \frac{1\times 3}{3^2+1^2} + \frac{1\times 3}{5^2+1^2} + \frac{1\times 3}{3^2+5^2} + \frac{1\times 3}{1^2+5^2} + \frac{1\times 3}{5^2+5^2}$$ (Eq. 17)

Then, the corrected evaluation value element E regarding the determined matrix elements 811*b* that are "1" in the turn-on order and the corrected evaluation value element E regarding the determined matrix elements 811*b* that are "2" in the turn-on order are totaled, yielding an evaluation value V of approximately 3.46 for the undetermined matrix element 811*a* in FIG. 10 (step S23). If the aforementioned correction were not performed, the evaluation value V would have been approximately 1.82. Thus, through the aforementioned correction, the evaluation value V for the undetermined matrix element 811*a* in FIG. 10 is increased and accordingly the undetermined matrix element 811*a* is less evaluated based on the evaluation value V.

Thereafter, as described above, the evaluation values V are obtained for all the undetermined matrix elements 811*a* including the undetermined matrix elements 811*a* in FIGS. 9 and 10 (step S24), and an undetermined matrix element 811*a* that is most highly evaluated based on the evaluation value V, i.e., an undetermined matrix element 811*a* with the smallest evaluation value V is obtained.

If the correction of step S329 were not performed, the evaluation value V for the undetermined matrix element 811*a* in FIG. 9 (approximately 1.53) would have been the smallest. However, as described above, through the correction of step S329, the correction value V for the undetermined matrix element 811*a* in FIG. 9 is approximately 4.62 and the evaluation value V for the undetermined matrix element 811*a* in FIG. 10 is approximately 3.46. Thus, the evaluation value V for the undetermined matrix element 811*a* in FIG. 10 is the smallest. As a result, as in the case where the correction in FIG. 15 is performed, the undetermined matrix element 811*a* in FIG. 10 is determined to be the third "3" in the turn-on order (step S25).

Through this, as described above, it is possible to provide a threshold matrix that suppresses the occurrence of a grid-like dot pattern when an image is recorded on a recording medium 9 and in which dots are readily arranged in an arrangement direction that forms an angle of 45 degrees with the row direction. It is also possible to provide a threshold matrix in which, when dots are arranged in the above arrangement direction, the distance in the row direction between dots and the distance in the column direction therebetween are each likely to be equal to the element pitch.

In the image recording apparatus 1, the correction in FIG. 15 and the correction in FIG. 17 may both be performed on the temporary evaluation value element Etmp. Specifically, the evaluation value element E may be obtained by, if the undetermined matrix element 811*a* is in the aforementioned other specific positional relationship with any of the determined matrix elements 811*b* when the repetitive application of a threshold matrix is taken into consideration, correcting a part of the temporary evaluation value element Etmp that corresponds to the determined matrix element 811*b* so that the undetermined matrix element 811*a* is more highly evaluated based on the evaluation value V, and if the undetermined matrix element 811*a* is not in the other specific positional relationship with any of the determined matrix elements 811*b* when the repetitive application of a threshold matrix is taken into consideration, correcting a part of the temporary evaluation value element Etmp that corresponds to the determined matrix element 811*b* so that the undetermined matrix element 811*a* is less evaluated based on the evaluation value V.

The other specific positional relationship in the image recording apparatus 1 is not limited to the aforementioned positional relationship, and it is sufficient for the other specific positional relationship to be such a positional relationship that an angle formed by the row direction and a direction in which a linear area that includes the determined matrix element 811*b* and the undetermined matrix element 811*a* extends is 45 degrees. Through this, it is possible to provide a threshold matrix that suppresses the occurrence of a grid-like dot pattern when an image is recorded on a recording medium 9 and in which dots are readily arranged in an arrangement direction that forms an angle of 45 degrees with the row direction. Also, the other specific positional relationship may further include a condition that the distance in the row direction between each of the determined matrix elements 811*b* and the undetermined matrix element 811*a* and the distance in the column direction therebetween are each less than or equal to a predetermined distance. Through this, it is possible to provide a threshold matrix that suppresses the occurrence of a grid-like dot pattern in which dots are arranged spaced apart from one another by a distance less than or equal to the predetermined distance in the row and column directions.

In the image recording apparatus 1, the evaluation value element E may be obtained by performing not only the correction in FIG. 6B and/or the correction in FIG. 14 but also the correction in FIG. 15 and/or the correction in FIG. 17 on the temporary evaluation value element Etmp. In this case as well, it is possible to provide a threshold matrix that suppresses the occurrence of a grid-like dot pattern when an image is recorded on a recording medium 9.

While the above has been a description of embodiments of the present invention, the above embodiments can be modified in various ways.

For example, the magnitude of the correction coefficient used in the aforementioned correction may be appropriately changed. Also, the correction coefficient may be changed between when the position in the turn-on order to be determined is less than a predetermined value and when it is greater than or equal to the predetermined value. Alternatively, the correction coefficient may be regarded as a function of the turn-on order and may be gradually increased or gradually reduced as the position in the turn-on order to be determined increases.

The image recording apparatus 1 does not necessarily have to perform the correction shown in at least one of FIGS. 6B, 14, 15, and 17 (hereinafter, simply referred to as the "aforementioned correction") when determining the positions of all the undetermined matrix elements 811a in the turn-on order. It is sufficient for the image recording apparatus 1 to perform the aforementioned correction at least when the number of determined matrix elements 811b is within a predetermined range, i.e., when the rate of the number of determined matrix elements 811b to the number of all the matrix elements 811 in a matrix area 80 is within a predetermined range. Through this, it is possible to provide a threshold matrix that suppresses the occurrence of a grid-like dot pattern within an appropriate range of tone values.

For example, a configuration is possible in which the aforementioned correction is performed if the position in the turn-on order to be determined is lower than a predetermined position in the turn-on order, and the aforementioned correction is not performed if the position in the turn-on order to be determined is higher than or equal to the predetermined position in the turn-on order. Conversely, a configuration is possible in which the aforementioned correction is not performed if the position in the turn-on order to be determined is lower than a predetermined position in the turn-on order, and the aforementioned correction is performed if the position in the turn-on order to be determined is higher or equal to the predetermined position in the turn-on order. Alternatively, the aforementioned correction may be performed when determining a position that is higher than or equal to a first position in the turn-on order and lower than a second position in the turn-on order, and the aforementioned correction may not be performed when determining a position that is lower than the first position in the turn-on order and when determining a position that is higher than or equal to the second position in the turn-on order. Furthermore, the aforementioned correction may be performed within a plurality of ranges in the entire turn-on order, and the aforementioned correction may not be performed within the other ranges.

In the above-described image recording apparatus, for example, the ejection unit 3 may be moved in the Y direction by the movement mechanism 2 over the recording media 9 that are not moving, as long as the recording media 9 travels in the Y direction relative to the ejection unit 3. The structure of the image recording apparatus may be applied to, for example, image recording apparatuses that perform interlace printing or to image recording apparatuses that record images on long rolls of paper. The recording media 9 may be films, thin metal plates, or the like other than printing paper.

The threshold matrix generated by the above-described threshold matrix generation method may be used in image recording apparatuses having other structures. For example, the threshold matrix may be used in an image recording apparatus that records an image on a lithographic plate serving as a target object by scanning the lithographic plate with a light beam emitted from a light source part, using a polygon mirror or the like. In this case, the light source part that emits the light beam serves as a dot output element, and the polygon mirror or the like serves as a movement mechanism that moves dot recording positions on the lithographic plate relative to the lithographic plate. The light source part may emit a plurality of light beams.

The configurations of the above-described preferred embodiments and variations may be appropriately combined as long as there are no mutual inconsistencies.

While the invention has been shown and described in detail, the foregoing description is in all aspects illustrative and not restrictive. It is therefore understood that numerous modifications and variations can be devised without departing from the scope of the invention. This application claims priority benefit under 35 U.S.C. Section 119 of Japanese Patent Application No. 2012-074257 filed in the Japan Patent Office on Mar. 28, 2012, the entire disclosure of which is incorporated herein by reference.

REFERENCE SIGNS LIST

1 Image recording apparatus
2 Movement mechanism
9 Recording medium
33 Outlet
41 Output control part
42 Operation part
70 Original image
80 Matrix area
81 Threshold matrix
422 Matrix storage part
423 Comparator
811 Matrix element
811a Undetermined matrix element
811b Determined matrix element
S11 to S13, S21 to S27, S221 to S224, S226 to S229, S321 to S324, S326 to S329 Step

The invention claimed is:

1. A threshold matrix generation method of generating a threshold matrix that is compared with a multi-tone original image when halftoning said original image, the method comprising the steps of:
   a) obtaining an evaluation value element for a given undetermined matrix element in a matrix area based on a positional relationship between each determined matrix element and said undetermined matrix element while taking into consideration repetitive application of a threshold matrix when halftoning an original image, said undetermined matrix element being a matrix element whose position in a turn-on order has not been determined, said turn-on order indicating an order in which dots are added with increasing tone level, said matrix area being an area where said threshold matrix is generated and in which a plurality of matrix elements are arranged in a row direction and a column direction, said determined matrix element being a matrix element whose position in said turn-on order has been determined;
   b) adding up an evaluation value element regarding said each determined matrix element so as to obtain an evaluation value for said undetermined matrix element;
   c) performing said steps a) and b) for all undetermined matrix elements;
   d) determining, in said turn-on order, a position of an undetermined matrix element that is most highly evaluated based on the evaluation value among said all undetermined matrix elements;
   e) repeating said steps a) through d) until positions of said all undetermined matrix elements in said turn-on order are determined; and
   f) determining a threshold value of each matrix element in said matrix area in accordance with said turn-on order,
   wherein, at least in a case where a ratio of the number of determined matrix elements to the number of said plurality of matrix elements is within a predetermined range, said step a) includes the steps of:
   a1) obtaining said evaluation value element based on a distance in said row direction between said undetermined matrix element and said each determined matrix element and a distance in said column direction between said undetermined matrix element and said each determined matrix element; and a2) if said positional relationship between said each determined matrix element and said undetermined matrix element is a predetermined specific positional relationship, correcting said evaluation value element regarding said each determined matrix element such that said undetermined matrix element is less evaluated based on said evaluation value, and if said positional relationship is not said specific positional relationship, correcting said evaluation value element regarding said each determined matrix element such that said undetermined matrix element is more highly evaluated based on said evaluation value, said specific positional relationship being a relationship in which said each determined matrix element is located in the same position as said undetermined matrix element with respect to said row direction or said column direction.

2. The threshold matrix generation method according to claim 1, wherein
said specific positional relationship further includes a condition that a distance between said each determined matrix element and said undetermined matrix element is less than or equal to a predetermined distance.

3. The threshold matrix generation method according to claim 2, wherein
said step a) further includes the step of:
a3) if said positional relationship between said each determined matrix element and said undetermined matrix element is another predetermined specific positional relationship, correcting said evaluation value element regarding said each determined matrix element such that said undetermined matrix element is more highly evaluated based on said evaluation value, and if said positional relationship is not said another specific positional relationship, correcting said evaluation value element regarding said each determined matrix element such that said undetermined matrix element is less evaluated based on said evaluation value,
said another specific positional relationship being a relationship in which an angle formed by said row direction and a direction in which a linear area that includes said each determined matrix element and said undetermined matrix element extends is 45 degrees.

4. The threshold matrix generation method according to claim 3, wherein
said another specific positional relationship further includes a condition that said distance in said row direction between said each determined matrix element and said undetermined matrix element and said distance in said column direction between said each determined matrix element and said undetermined matrix element are each less than or equal to a predetermined distance.

5. The threshold matrix generation method according to claim 3, wherein
said another specific positional relationship further includes a condition that said distance in said row direction between said each determined matrix element and said undetermined matrix element and said distance in said column direction between said each determined matrix element and said undetermined matrix element are each equal to a pitch of said matrix elements.

6. The threshold matrix generation method according to claim 1, wherein
said specific positional relationship further includes a condition that a distance between said each determined matrix element and said undetermined matrix element is two times a pitch of said matrix elements.

7. The threshold matrix generation method according to claim 6, wherein
said step a) further includes the step of:
a3) if said positional relationship between said each determined matrix element and said undetermined matrix element is another predetermined specific positional relationship, correcting said evaluation value element regarding said each determined matrix element such that said undetermined matrix element is more highly evaluated based on said evaluation value, and if said positional relationship is not said another specific positional relationship, correcting said evaluation value element regarding said each determined matrix element such that said undetermined matrix element is less evaluated based on said evaluation value,
said another specific positional relationship being a relationship in which an angle formed by said row direction and a direction in which a linear area that includes said each determined matrix element and said undetermined matrix element extends is 45 degrees.

8. The threshold matrix generation method according to claim 7, wherein
said another specific positional relationship further includes a condition that said distance in said row direction between said each determined matrix element and said undetermined matrix element and said distance in said column direction between said each determined matrix element and said undetermined matrix element are each less than or equal to a predetermined distance.

9. The threshold matrix generation method according to claim 7, wherein
said another specific positional relationship further includes a condition that said distance in said row direction between said each determined matrix element and said undetermined matrix element and said distance in said column direction between said each determined matrix element and said undetermined matrix element are each equal to a pitch of said matrix elements.

10. The threshold matrix generation method according to claim 1, wherein
said step a) further includes the step of:
a3) if said positional relationship between said each determined matrix element and said undetermined matrix element is another predetermined specific positional relationship, correcting said evaluation value element regarding said each determined matrix element such that said undetermined matrix element is more highly evaluated based on said evaluation value, and if said positional relationship is not said another specific positional relationship, correcting said evaluation value element regarding said each determined matrix element such that said undetermined matrix element is less evaluated based on said evaluation value,
said another specific positional relationship being a relationship in which an angle formed by said row direction and a direction in which a linear area that includes said each determined matrix element and said undetermined matrix element extends is 45 degrees.

11. The threshold matrix generation method according to claim 10, wherein
said another specific positional relationship further includes a condition that said distance in said row direction between said each determined matrix element and said undetermined matrix element and said distance in said column direction between said each determined matrix element and said undetermined matrix element are each less than or equal to a predetermined distance.

12. The threshold matrix generation method according to claim 10, wherein
said another specific positional relationship further includes a condition that said distance in said row direction between said each determined matrix element and said undetermined matrix element and said distance in said column direction between said each determined matrix element and said undetermined matrix element are each equal to a pitch of said matrix elements.

13. A threshold matrix generation method of generating a threshold matrix that is compared with a multi-tone original image when halftoning said original image, the method comprising the steps of:
a) obtaining an evaluation value element for a given undetermined matrix element in a matrix area based on a positional relationship between each determined matrix element and said undetermined matrix element while taking into consideration repetitive application of a threshold matrix when halftoning an original image, said undetermined matrix element being a matrix element whose position in a turn-on order has not been determined, said turn-on order indicating an order in which dots are added with increasing tone level, said matrix area being an area where said threshold matrix is generated and in which a plurality of matrix elements are arranged in a row direction and a column direction, said determined matrix element being a matrix element whose position in said turn-on order has been determined;
b) adding up an evaluation value element regarding said each determined matrix element so as to obtain an evaluation value for said undetermined matrix element;
c) performing said steps a) and b) for all undetermined matrix elements;
d) determining, in said turn-on order, a position of an undetermined matrix element that is most highly evaluated based on the evaluation value among said all undetermined matrix elements;
e) repeating said steps a) through d) until positions of said all undetermined matrix elements in said turn-on order are determined; and
f) determining a threshold value of each matrix element in said matrix area in accordance with said turn-on order,
wherein, at least in a case where a ratio of the number of determined matrix elements to the number of said plurality of matrix elements is within a predetermined range, said step a) includes the steps of:
a1) obtaining said evaluation value element based on a distance in said row direction between said undetermined matrix element and said each determined matrix element and a distance in said column direction between said undetermined matrix element and said each determined matrix element; and
a2) if said positional relationship between said each determined matrix element and said undetermined matrix element is a predetermined specific positional relationship, correcting said evaluation value element regarding said each determined matrix element such that said undetermined matrix element is more highly evaluated based on said evaluation value, and if said positional relationship is not said specific positional relationship, correcting said evaluation value element regarding said each determined matrix element such that said undetermined matrix element is less evaluated based on said evaluation value,
said specific positional relationship being a relationship in which an angle formed by said row direction and a direction in which a linear area that includes said each determined matrix element and said undetermined matrix element extends is 45 degrees.

14. The threshold matrix generation method according to claim 13, wherein
said specific positional relationship further includes a condition that said distance in said row direction between said each determined matrix element and said undetermined matrix element and said distance in said column direction between said each determined matrix element and said undetermined matrix element are each less than or equal to a predetermined distance.

15. The threshold matrix generation method according to claim 13, wherein
said specific positional relationship further includes a condition that said distance in said row direction between said each determined matrix element and said undetermined matrix element and said distance in said column direction between said each determined matrix element and said undetermined matrix element are each equal to a pitch of said matrix elements.

16. An image data generation method of generating image data, comprising the steps of:
generating a threshold matrix; and
generating halftone image data in which a multi-tone original image is halftoned by comparing said original image with said threshold matrix,
wherein said step of generating said threshold matrix includes the steps of:
a) obtaining an evaluation value element for a given undetermined matrix element in a matrix area based on a positional relationship between each determined matrix element and said undetermined matrix element while taking into consideration repetitive application of a threshold matrix when halftoning an original image, said undetermined matrix element being a matrix element whose position in a turn-on order has not been determined, said turn-on order indicating an order in which dots are added with increasing tone level, said matrix area being an area where said threshold matrix is generated and in which a plurality of matrix elements are arranged in a row direction and a column direction, said determined matrix element being a matrix element whose position in said turn-on order has been determined;
b) adding up an evaluation value element regarding said each determined matrix element so as to obtain an evaluation value for said undetermined matrix element;
c) performing said steps a) and b) for all undetermined matrix elements;
d) determining, in said turn-on order, a position of an undetermined matrix element that is most highly evaluated based on the evaluation value among said all undetermined matrix elements;
e) repeating said steps a) through d) until positions of said all undetermined matrix elements in said turn-on order are determined; and
f) determining a threshold value of each matrix element in said matrix area in accordance with said turn-on order,
wherein, at least in a case where a ratio of the number of determined matrix elements to the number of said plurality of matrix elements is within a predetermined range, said step a) includes the steps of:

a1) obtaining said evaluation value element based on a distance in said row direction between said undetermined matrix element and said each determined matrix element and a distance in said column direction between said undetermined matrix element and said each determined matrix element; and a2) if said positional relationship between said each determined matrix element and said undetermined matrix element is a predetermined specific positional relationship, correcting said evaluation value element regarding said each determined matrix element such that said undetermined matrix element is less evaluated based on said evaluation value, and if said positional relationship is not said specific positional relationship, correcting said evaluation value element regarding said each determined matrix element such that said undetermined matrix element is more highly evaluated based on said evaluation value, said specific positional relationship being a relationship in which said each determined matrix element is located in the same position as said undetermined matrix element with respect to said row direction or said column direction.

17. An image data generation method of generating image data, comprising the steps of:

generating a threshold matrix; and generating halftone image data in which a multi-tone original image is halftoned by comparing said original image with said threshold matrix, wherein said step of generating said threshold matrix includes the steps of:

a) obtaining an evaluation value element for a given undetermined matrix element in a matrix area based on a positional relationship between each determined matrix element and said undetermined matrix element while taking into consideration repetitive application of a threshold matrix when halftoning an original image, said undetermined matrix element being a matrix element whose position in a turn-on order has not been determined, said turn-on order indicating an order in which dots are added with increasing tone level, said matrix area being an area where said threshold matrix is generated and in which a plurality of matrix elements are arranged in a row direction and a column direction, said determined matrix element being a matrix element whose position in said turn-on order has been determined;

b) adding up an evaluation value element regarding said each determined matrix element so as to obtain an evaluation value for said undetermined matrix element;

c) performing said steps a) and b) for all undetermined matrix elements;

d) determining, in said turn-on order, a position of an undetermined matrix element that is most highly evaluated based on the evaluation value among said all undetermined matrix elements;

e) repeating said steps a) through d) until positions of said all undetermined matrix elements in said turn-on order are determined; and f) determining a threshold value of each matrix element in said matrix area in accordance with said turn-on order, wherein, at least in a case where a ratio of the number of determined matrix elements to the number of said plurality of matrix elements is within a predetermined range, said step a) includes the steps of:

a1) obtaining said evaluation value element based on a distance in said row direction between said undetermined matrix element and said each determined matrix element and a distance in said column direction between said undetermined matrix element and said each determined matrix element; and a2) if said positional relationship between said each determined matrix element and said undetermined matrix element is a predetermined specific positional relationship, correcting said evaluation value element regarding said each determined matrix element such that said undetermined matrix element is more highly evaluated based on said evaluation value, and if said positional relationship is not said specific positional relationship, correcting said evaluation value element regarding said each determined matrix element such that said undetermined matrix element is less evaluated based on said evaluation value, said specific positional relationship being a relationship in which an angle formed by said row direction and a direction in which a linear area that includes said each determined matrix element and said undetermined matrix element extends is 45 degrees.

18. An image data generation apparatus for generating image data, comprising:

a matrix storage part that stores a threshold matrix; and an image data generation part that generates halftone image data in which a multi-tone original image is halftoned by comparing said original image with said threshold matrix, wherein said threshold matrix is generated by executing the steps of:

a) obtaining an evaluation value element for a given undetermined matrix element in a matrix area based on a positional relationship between each determined matrix element and said undetermined matrix element while taking into consideration repetitive application of a threshold matrix when halftoning an original image, said undetermined matrix element being a matrix element whose position in a turn-on order has not been determined, said turn-on order indicating an order in which dots are added with increasing tone level, said matrix area being an area where said threshold matrix is generated and in which a plurality of matrix elements are arranged in a row direction and a column direction, said determined matrix element being a matrix element whose position in said turn-on order has been determined;

b) adding up an evaluation value element regarding said each determined matrix element so as to obtain an evaluation value for said undetermined matrix element;

c) performing said steps a) and b) for all undetermined matrix elements;

d) determining, in said turn-on order, a position of an undetermined matrix element that is most highly evaluated based on the evaluation value among said all undetermined matrix elements;

e) repeating said steps a) through d) until positions of said all undetermined matrix elements in said turn-on order are determined; and f) determining a threshold value of each matrix element in said matrix area in accordance with said turn-on order, wherein, at least in a case where a ratio of the number of determined matrix elements to the number of said plurality of matrix elements is within a predetermined range, said step a) includes the steps of:

a1) obtaining said evaluation value element based on a distance in said row direction between said undetermined matrix element and said each determined matrix element and a distance in said column direction between said undetermined matrix element and said each determined matrix element; and a2) if said positional relationship between said each determined matrix element and said undetermined matrix element is a predetermined specific positional relationship, correcting said evaluation value element regarding said each determined matrix element such that said undetermined matrix element is less evaluated based on said evaluation value, and if said positional relationship is not said specific positional relationship, correcting said evaluation value element regarding said each determined matrix element such that said undetermined matrix element is more highly evaluated based on said evaluation value, said specific positional relationship being a relationship in which said each determined matrix element is located in the same position as said undetermined matrix element with respect to said row direction or said column direction.

19. An image data generation apparatus for generating image data, comprising:

a matrix storage part that stores a threshold matrix; and an image data generation part that generates halftone image data in which a multi-tone original image is halftoned by comparing said original image with said threshold matrix, wherein said threshold matrix is generated by executing the steps of:

a) obtaining an evaluation value element for a given undetermined matrix element in a matrix area based on a positional relationship between each determined matrix element and said undetermined matrix element while taking into consideration repetitive application of a threshold matrix when halftoning an original image, said undetermined matrix element being a matrix element whose position in a turn-on order has not been determined, said turn-on order indicating an order in which dots are added with increasing tone level, said matrix area being an area where said threshold matrix is generated and in which a plurality of matrix elements are arranged in a row direction and a column direction, said determined matrix element being a matrix element whose position in said turn-on order has been determined;

b) adding up an evaluation value element regarding said each determined matrix element so as to obtain an evaluation value for said undetermined matrix element;

c) performing said steps a) and b) for all undetermined matrix elements;

d) determining, in said turn-on order, a position of an undetermined matrix element that is most highly evaluated based on the evaluation value among said all undetermined matrix elements;

e) repeating said steps a) through d) until positions of said all undetermined matrix elements in said turn-on order are determined; and f) determining a threshold value of each matrix element in said matrix area in accordance with said turn-on order, wherein, at least in a case where a ratio of the number of determined matrix elements to the number of said plurality of matrix elements is within a predetermined range, said step a) includes the steps of:

a1) obtaining said evaluation value element based on a distance in said row direction between said undetermined matrix element and said each determined matrix element and a distance in said column direction between said undetermined matrix element and said each determined matrix element; and a2) if said positional relationship between said each determined matrix element and said undetermined matrix element is a predetermined specific positional relationship, correcting said evaluation value element regarding said each determined matrix element such that said undetermined matrix element is more highly evaluated based on said evaluation value, and if said positional relationship is not said specific positional relationship, correcting said evaluation value element regarding said each determined matrix element such that said undetermined matrix element is less evaluated based on said evaluation value, said specific positional relationship being a relationship in which an angle formed by said row direction and a direction in which a linear area that includes said each determined matrix element and said undetermined matrix element extends is 45 degrees.

20. An image recording apparatus comprising:

a dot output element that records a dot at a dot recording position on a recording medium;

a movement mechanism that moves said dot recording position on said recording medium relative to said recording medium;

a matrix storage part that stores a threshold matrix;

an image data generation part that generates halftone image data in which a multi-tone original image is halftoned by comparing said original image with said threshold matrix; and an output control part that controls output of said dot output element based on said halftone image data in parallel with movement of said dot recording position on said recording medium relative to said recording medium, wherein said threshold matrix is generated by executing the steps of:

a) obtaining an evaluation value element for a given undetermined matrix element in a matrix area based on a positional relationship between each determined matrix element and said undetermined matrix element while taking into consideration repetitive application of a threshold matrix when halftoning an original image, said undetermined matrix element being a matrix element whose position in a turn-on order has not been determined, said turn-on order indicating an order in which dots are added with increasing tone level, said matrix area being an area where said threshold matrix is generated and in which a plurality of matrix elements are arranged in a row direction and a column direction, said determined matrix element being a matrix element whose position in said turn-on order has been determined;

b) adding up an evaluation value element regarding said each determined matrix element so as to obtain an evaluation value for said undetermined matrix element;

c) performing said steps a) and b) for all undetermined matrix elements;

d) determining, in said turn-on order, a position of an undetermined matrix element that is most highly evaluated based on the evaluation value among said all undetermined matrix elements;

e) repeating said steps a) through d) until positions of said all undetermined matrix elements in said turn-on order are determined; and f) determining a threshold value of each matrix element in said matrix area in accordance with said turn-on order, wherein, at least in a case where a ratio of the number of determined matrix elements to the number of said plurality of matrix elements is within a predetermined range, said step a) includes the steps of:

a1) obtaining said evaluation value element based on a distance in said row direction between said undetermined matrix element and said each determined matrix element and a distance in said column direction between said undetermined matrix element and said each determined matrix element; and a2) if said positional relationship between said each determined matrix element and said undetermined matrix element is a predetermined specific positional relationship, correcting said evaluation value element regarding said each determined matrix element such that said undetermined matrix element is less evaluated based on said evaluation value, and if said positional relationship is not said specific positional relationship, correcting said evaluation value element regarding said each determined matrix element such that said undetermined matrix element is more highly evaluated based on said evaluation value, said specific positional relationship being a relationship in which said each determined matrix element is located in the same position as said undetermined matrix element with respect to said row direction or said column direction.

21. An image recording apparatus comprising:

a dot output element that records a dot at a dot recording position on a recording medium;

a movement mechanism that moves said dot recording position on said recording medium relative to said recording medium;

a matrix storage part that stores a threshold matrix;

an image data generation part that generates halftone image data in which a multi-tone original image is halftoned by comparing said original image with said threshold matrix; and an output control part that controls output of said dot output element based on said halftone image data in parallel with movement of said dot recording position on said recording medium relative to said recording medium, wherein said threshold matrix is generated by executing the steps of:

a) obtaining an evaluation value element for a given undetermined matrix element in a matrix area based on a positional relationship between each determined matrix element and said undetermined matrix element while taking into consideration repetitive application of a threshold matrix when halftoning an original image, said undetermined matrix element being a matrix element whose position in a turn-on order has not been determined, said turn-on order indicating an order in which dots are added with increasing tone level, said matrix area being an area where said threshold matrix is generated and in which a plurality of matrix elements are arranged in a row direction and a column direction, said determined matrix element being a matrix element whose position in said turn-on order has been determined;

b) adding up an evaluation value element regarding said each determined matrix element so as to obtain an evaluation value for said undetermined matrix element;

c) performing said steps a) and b) for all undetermined matrix elements;

d) determining, in said turn-on order, a position of an undetermined matrix element that is most highly evaluated based on the evaluation value among said all undetermined matrix elements;

e) repeating said steps a) through d) until positions of said all undetermined matrix elements in said turn-on order are determined; and f) determining a threshold value of each matrix element in said matrix area in accordance with said turn-on order, wherein, at least in a case where a ratio of the number of determined matrix elements to the number of said plurality of matrix elements is within a predetermined range, said step a) includes the steps of:

a1) obtaining said evaluation value element based on a distance in said row direction between said undetermined matrix element and said each determined matrix element and a distance in said column direction between said undetermined matrix element and said each determined matrix element; and a2) if said positional relationship between said each determined matrix element and said undetermined matrix element is a predetermined specific positional relationship, correcting said evaluation value element regarding said each determined matrix element such that said undetermined matrix element is more highly evaluated based on said evaluation value, and if said positional relationship is not said specific positional relationship, correcting said evaluation value element regarding said each determined matrix element such that said undetermined matrix element is less evaluated based on said evaluation value, said specific positional relationship being a relationship in which an angle formed by said row direction and a direction in which a linear area that includes said each determined matrix element and said undetermined matrix element extends is 45 degrees.

22. A computer-readable storage medium that records a threshold matrix that is compared with a multi-tone original image when halftoning said original image, said threshold matrix being generated by executing the steps of:

a) obtaining an evaluation value element for a given undetermined matrix element in a matrix area based on a positional relationship between each determined matrix element and said undetermined matrix element while taking into consideration repetitive application of a threshold matrix when halftoning an original image, said undetermined matrix element being a matrix element whose position in a turn-on order has not been determined, said turn-on order indicating an order in which dots are added with increasing tone level, said matrix area being an area where said threshold matrix is generated and in which a plurality of matrix elements are arranged in a row direction and a column direction, said determined matrix element being a matrix element whose position in said turn-on order has been determined;

b) adding up an evaluation value element regarding said each determined matrix element so as to obtain an evaluation value for said undetermined matrix element;

c) performing said steps a) and b) for all undetermined matrix elements;

d) determining, in said turn-on order, a position of an undetermined matrix element that is most highly evaluated based on the evaluation value among said all undetermined matrix elements;

e) repeating said steps a) through d) until positions of said all undetermined matrix elements in said turn-on order are determined; and f) determining a threshold value of each matrix element in said matrix area in accordance with said turn-on order, wherein, at least in a case where a ratio of the number of determined matrix elements to the number of said plurality of matrix elements is within a predetermined range, said step a) includes the steps of:

a1) obtaining said evaluation value element based on a distance in said row direction between said undetermined matrix element and said each determined matrix element and a distance in said column direction between said undetermined matrix element and said each determined matrix element; and a2) if said positional relationship between said each determined matrix element and said undetermined matrix element is a predetermined specific positional relationship, correcting said evaluation value element regarding said each determined matrix element such that said undetermined matrix element is less evaluated based on said evaluation value, and if said positional relationship is not said specific positional relationship, correcting said evaluation value element regarding said each determined matrix element such that said undetermined matrix element is more highly evaluated based on said evaluation value, said specific positional relationship being a relationship in which said each determined matrix element is located in the same position as said undetermined matrix element with respect to said row direction or said column direction.

23. A computer-readable storage medium that records a threshold matrix that is compared with a multi-tone original image when halftoning said original image, said threshold matrix being generated by executing the steps of:

a) obtaining an evaluation value element for a given undetermined matrix element in a matrix area based on a positional relationship between each determined matrix element and said undetermined matrix element while taking into consideration repetitive application of a threshold matrix when halftoning an original image, said undetermined matrix element being a matrix element whose position in a turn-on order has not been determined, said turn-on order indicating an order in which dots are added with increasing tone level, said matrix area being an area where said threshold matrix is generated and in which a plurality of matrix elements are arranged in a row direction and a column direction, said determined matrix element being a matrix element whose position in said turn-on order has been determined;

b) adding up an evaluation value element regarding said each determined matrix element so as to obtain an evaluation value for said undetermined matrix element;

c) performing said steps a) and b) for all undetermined matrix elements;

d) determining, in said turn-on order, a position of an undetermined matrix element that is most highly evaluated based on the evaluation value among said all undetermined matrix elements;

e) repeating said steps a) through d) until positions of said all undetermined matrix elements in said turn-on order are determined; and f) determining a threshold value of each matrix element in said matrix area in accordance with said turn-on order, wherein, at least in a case where a ratio of the number of determined matrix elements to the number of said plurality of matrix elements is within a predetermined range, said step a) includes the steps of:

a1) obtaining said evaluation value element based on a distance in said row direction between said undetermined matrix element and said each determined matrix element and a distance in said column direction between said undetermined matrix element and said each determined matrix element; and a2) if said positional relationship between said each determined matrix element and said undetermined matrix element is a predetermined specific positional relationship, correcting said evaluation value element regarding said each determined matrix element such that said undetermined matrix element is more highly evaluated based on said evaluation value, and if said positional relationship is not said specific positional relationship, correcting said evaluation value element regarding said each determined matrix element such that said undetermined matrix element is less evaluated based on said evaluation value, said specific positional relationship being a relationship in which an angle formed by said row direction and a direction in which a linear area that includes said each determined matrix element and said undetermined matrix element extends is 45 degrees.

* * * * *